(12) United States Patent
Ukai et al.

(10) Patent No.: US 12,226,841 B2
(45) Date of Patent: Feb. 18, 2025

(54) RECIPROCATING CUTTING TOOL

(71) Applicant: MAKITA CORPORATION, Anjo (JP)

(72) Inventors: Tomohiro Ukai, Anjo (JP); Shoichi Ishikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 267 days.

(21) Appl. No.: 17/678,257

(22) Filed: Feb. 23, 2022

(65) Prior Publication Data
US 2022/0305575 A1    Sep. 29, 2022

(30) Foreign Application Priority Data

Mar. 26, 2021  (JP) .................. 2021-053895

(51) Int. Cl.
*B23D 49/16*   (2006.01)
*B25F 5/00*    (2006.01)

(52) U.S. Cl.
CPC ............. *B23D 49/16* (2013.01); *B25F 5/008* (2013.01)

(58) Field of Classification Search
None
See application file for complete search history.

(56) References Cited

U.S. PATENT DOCUMENTS 10,511,208  B2 *  12/2019  Hara .................. H02K 7/04
2005/0246905  A1    11/2005  Tozawa et al.
2021/0039242  A1     2/2021  Ogura
2022/0009011  A1 *   1/2022  Li ..................... B23D 49/165
2022/0305575  A1 *   9/2022  Ukai .................. B23D 59/006
2022/0305577  A1 *   9/2022  Yamashita ........... B23D 49/16

FOREIGN PATENT DOCUMENTS

CN   211940783 U  * 11/2020 ............ B23D 49/10
JP   2005-319542 A    11/2005
JP      4554982 B2     9/2010
JP   2021-024065 A     2/2021

OTHER PUBLICATIONS

English translation of CN-211940783-U, Publication Date Nov. 17, 2020.*
Jul. 30, 2024 Office Action issued in Japanese Patent Appl. No. 2021-053895.

* cited by examiner

Primary Examiner — Hwei-Siu C Payer
(74) Attorney, Agent, or Firm — Oliff PLC

(57) ABSTRACT

A reciprocating cutting tool reduces dispersion of dust. The reciprocating cutting tool includes a reciprocation converter drivable by a motor, a rod-like slider connected to the reciprocation converter to be reciprocable, a blade holder at the front end of the slider to hold a blade, a power transmission housing housing the reciprocation converter and allowing the slider to protrude from its front end, a cover outward from the power transmission housing, and a fan rotatable together with a rotor in the motor. A first passage of cooling air from the fan is defined between the power transmission housing and the cover. The first passage branches into a second passage toward the blade holder and a third passage not toward the blade holder.

16 Claims, 19 Drawing Sheets

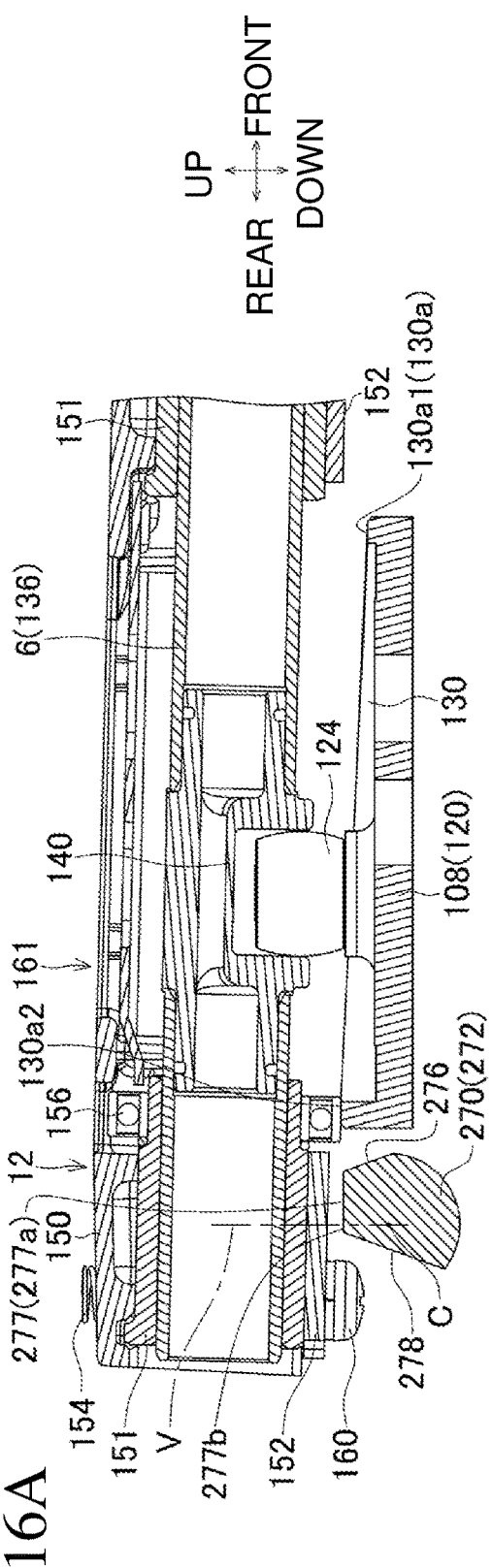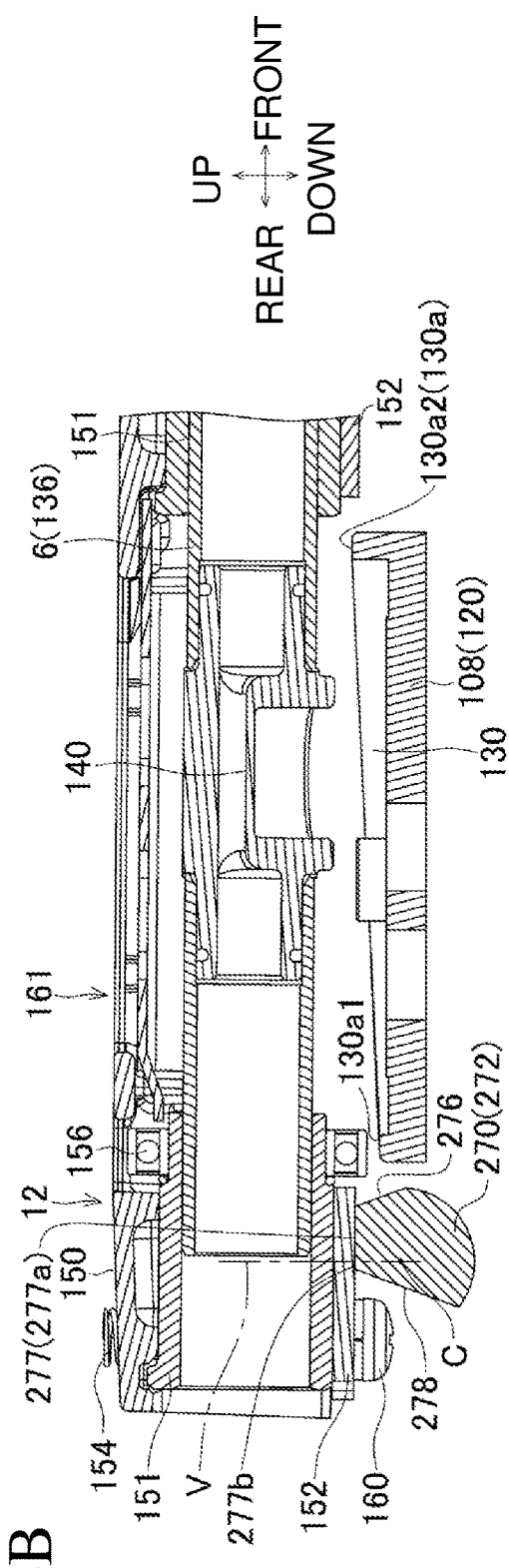

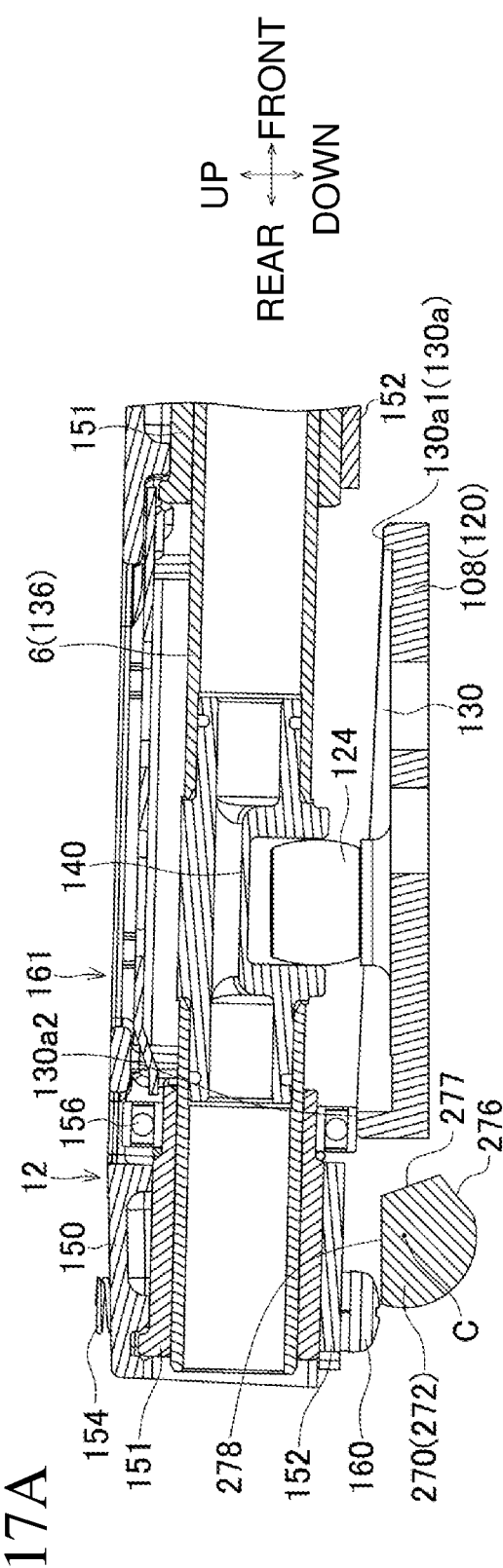

RECIPROCATING CUTTING TOOL

CROSS-REFERENCE TO RELATED APPLICATIONS

This application claims the benefit of priority to Japanese Patent Application No. 2021-053895, filed on Mar. 26, 2021, the entire contents of which are hereby incorporated by reference.

BACKGROUND

1. Technical Field

The present disclosure relates to a reciprocating cutting tool such as a rechargeable reciprocating saw.

2. Description of the Background

Japanese Patent No. 4554982 describes a reciprocating saw including a blade-receiving slider that reciprocates with orbital action.

Japanese Patent No. 4554982 also describes a reciprocating saw that discharges cooling air forward along the slider.

BRIEF SUMMARY

Reciprocating cutting tools are expected to switch stably between the on and off states of orbital action or between the degrees of orbital action.

Reciprocating cutting tools are also expected to reduce dispersion of dust (chips).

A first aspect of the present disclosure provides a reciprocating cutting tool, including:
- a motor including a stator and a rotor;
- a reciprocation converter drivable by the motor;
- a slider being rod-like, the slider being connected to the reciprocation converter to be reciprocable;
- a tip tool holder at a front end of the slider to hold a tip tool;
- a power transmission housing housing the reciprocation converter and allowing the slider to protrude from a front end of the power transmission housing;
- a fan rotatable together with the rotor; and
- a cover outward from the power transmission housing, the cover defining a first passage of cooling air from the fan between the power transmission housing and the cover, the first passage branching into a second passage toward the tip tool holder and a third passage not toward the tip tool holder.

A second aspect of the present disclosure provides a reciprocating cutting tool, including:
- a motor including a stator and a rotor;
- a reciprocation converter drivable by the motor;
- a slider being rod-like, the slider being connected to the reciprocation converter to be reciprocable;
- a tip tool holder at a front end of the slider to hold a tip tool;
- a power transmission housing housing the reciprocation converter and allowing the slider to protrude from a front end of the power transmission housing;
- a fan rotatable together with the rotor; and
- a cover outward from the power transmission housing, the cover defining a first passage of cooling air from the fan between the power transmission housing and the cover, the first passage connecting to a passage toward an outside without connecting toward the tip tool holder.

The reciprocating tool according to the above aspects of the present disclosure switches stably between the on and off states of orbital action or between the degrees of orbital action.

The reciprocating tool according to the above aspects of the present disclosure also reduces dispersion of dust.

BRIEF DESCRIPTION OF DRAWINGS

FIG. 16A is a central longitudinal sectional view of the main portion of the reciprocating saw in FIG. 15A, with the highest point on the cam surface at the rearmost position in a 1-2-orbital mode, and FIG. 16B is a central longitudinal sectional view of the main portion of the reciprocating saw in FIG. 16A, with the lowest point on the cam surface at the rearmost position in the 1-2-orbital mode.

FIG. 17A is a central longitudinal sectional view of the main portion of the reciprocating saw in FIG. 15A, with the highest point on the cam surface at the rearmost position in a second orbital mode, and FIG. 17B is a central longitudinal sectional view of the main portion of the reciprocating saw in FIG. 17A, with the lowest point on the cam surface at the rearmost position in the second orbital mode.

DETAILED DESCRIPTION

Embodiments and modifications of the present disclosure will now be described with reference to the drawings as appropriate.

A reciprocating cutting tool according to one or more embodiments includes a power tool or a reciprocating tool, or more specifically, a reciprocating saw.

The directional terms such as front, rear, up, down, right, and left in the embodiments and the modifications are defined for ease of explanation, and may be changed depending on, for example, at least the operating situations or the status of a movable member.

The present disclosure is not limited to the embodiments and the modifications.

First Embodiment

Figure 1:
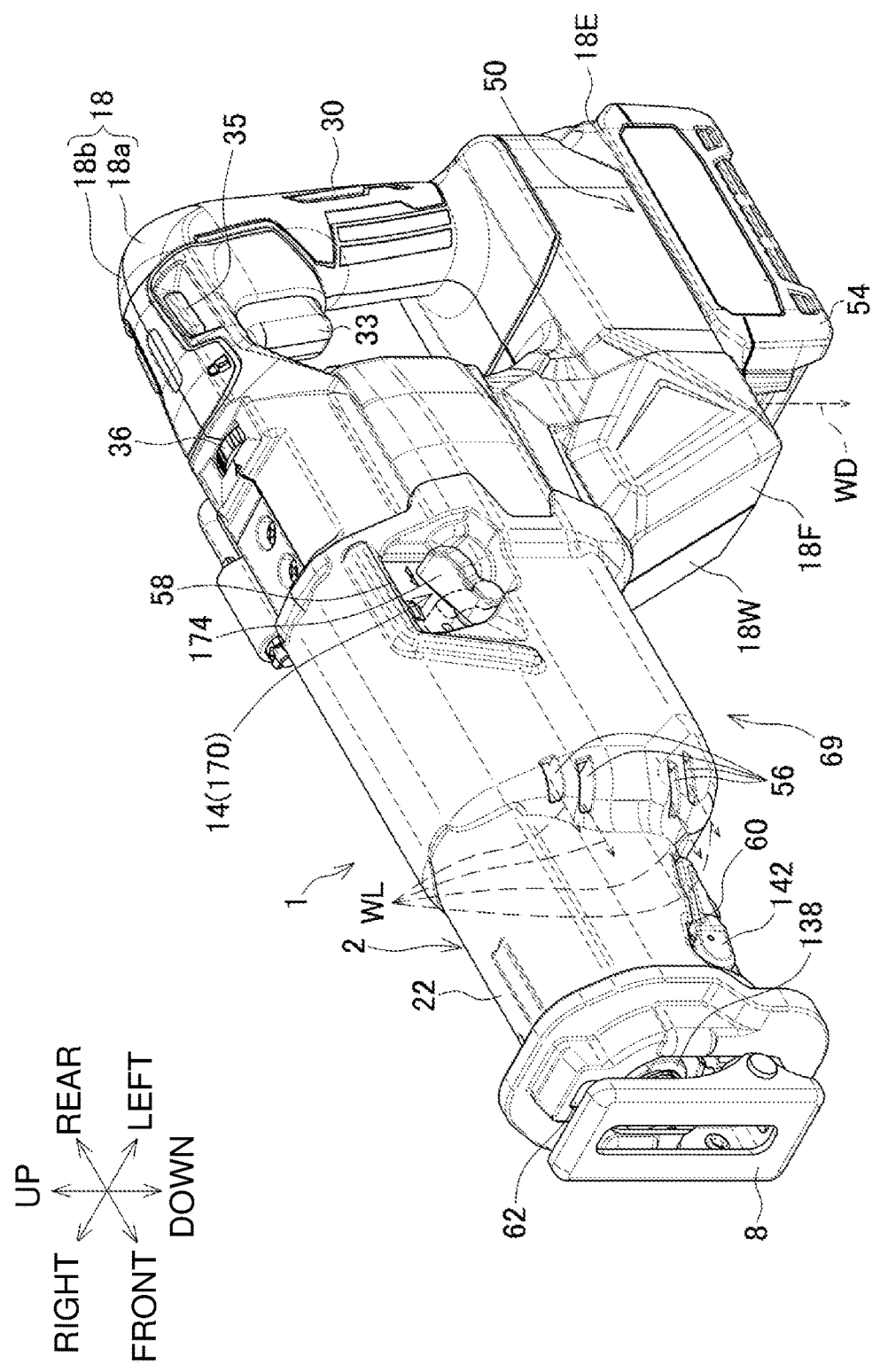
FIG. 1 is a perspective view of a reciprocating saw according to a first embodiment as viewed from the upper left front.
Figure 2:
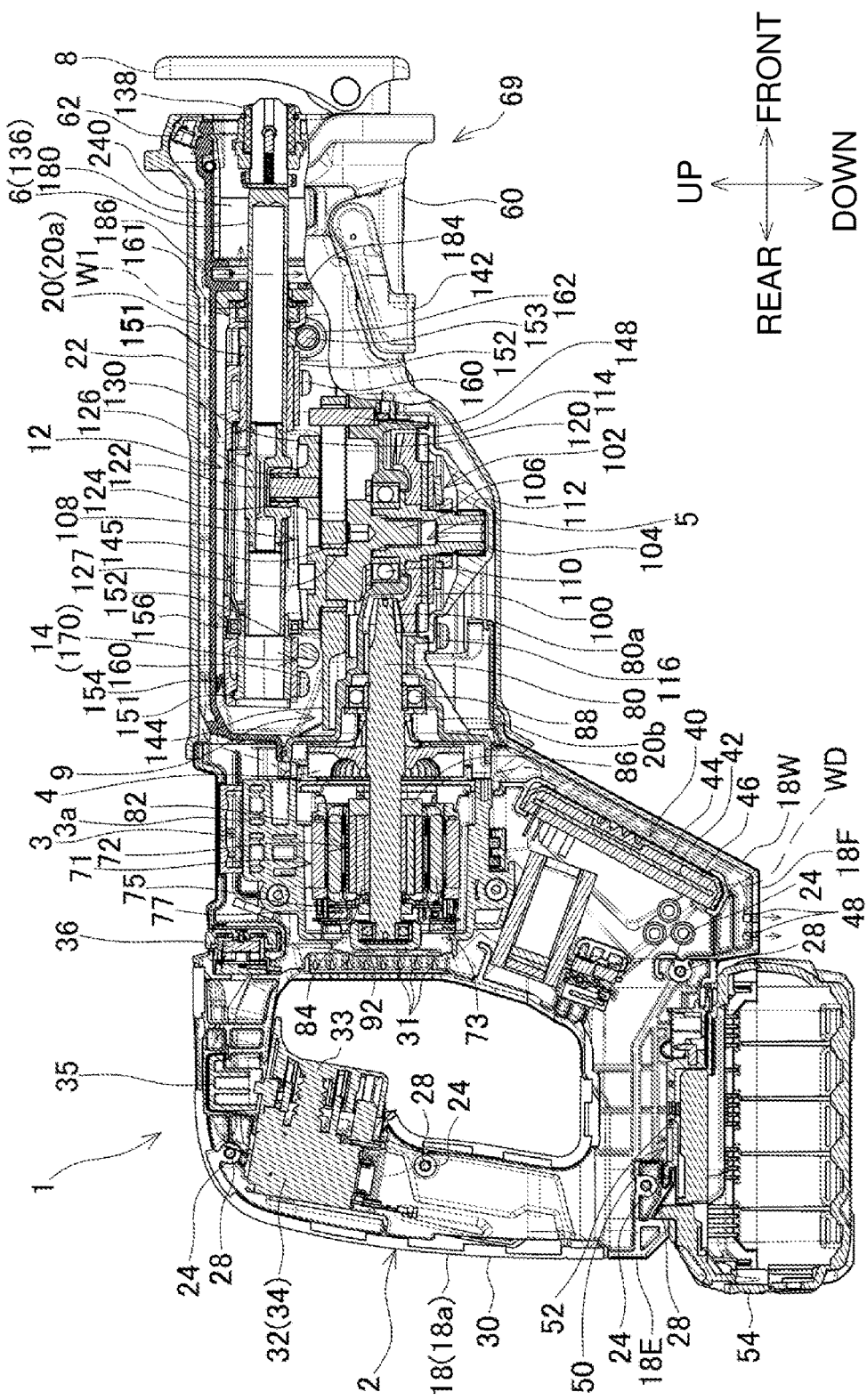
FIG. 2 is a central longitudinal sectional view of the structure shown in FIG. 1.
Figure 3:
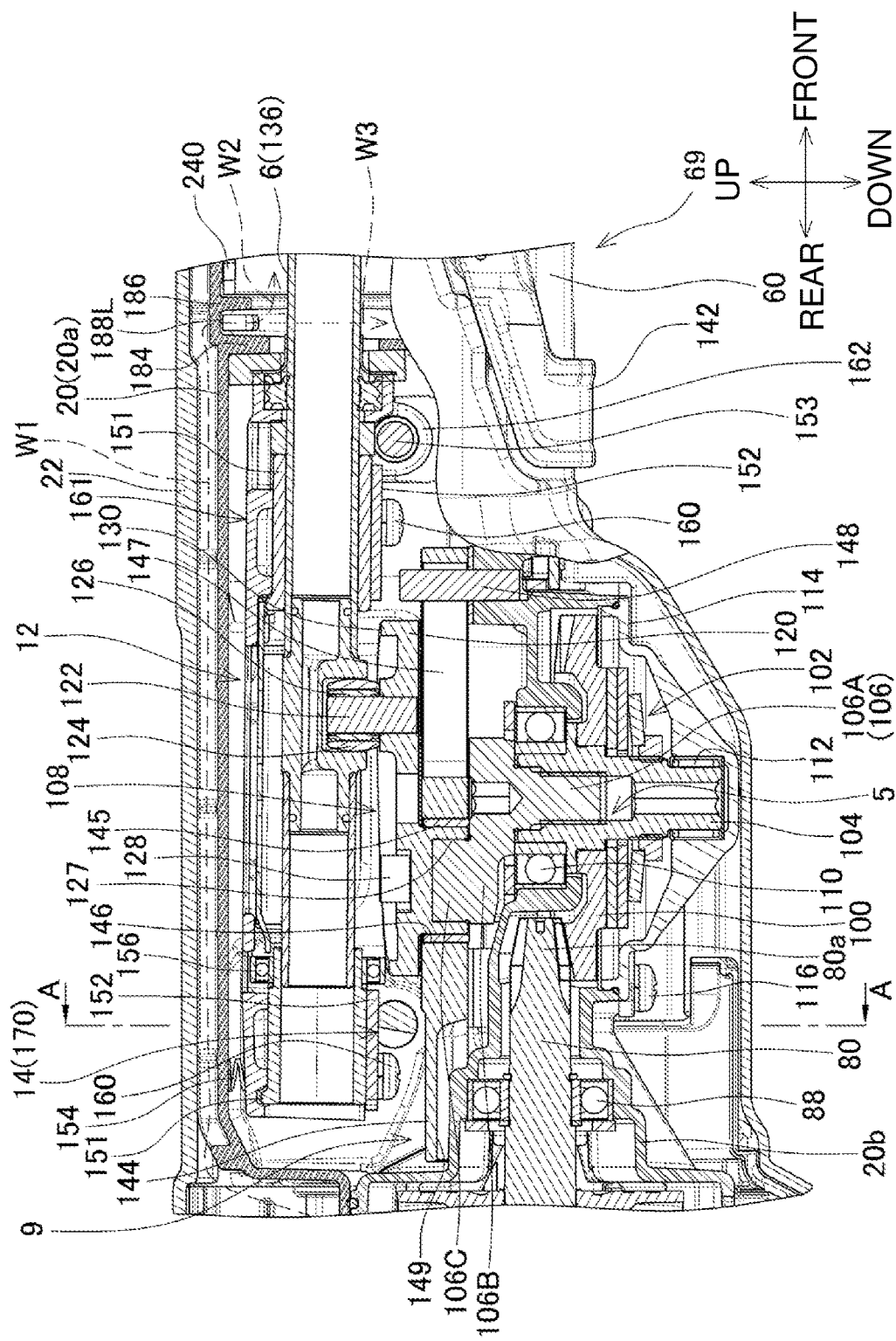
FIG. 3 is a partial enlarged view of FIG. 2.
Figure 4:
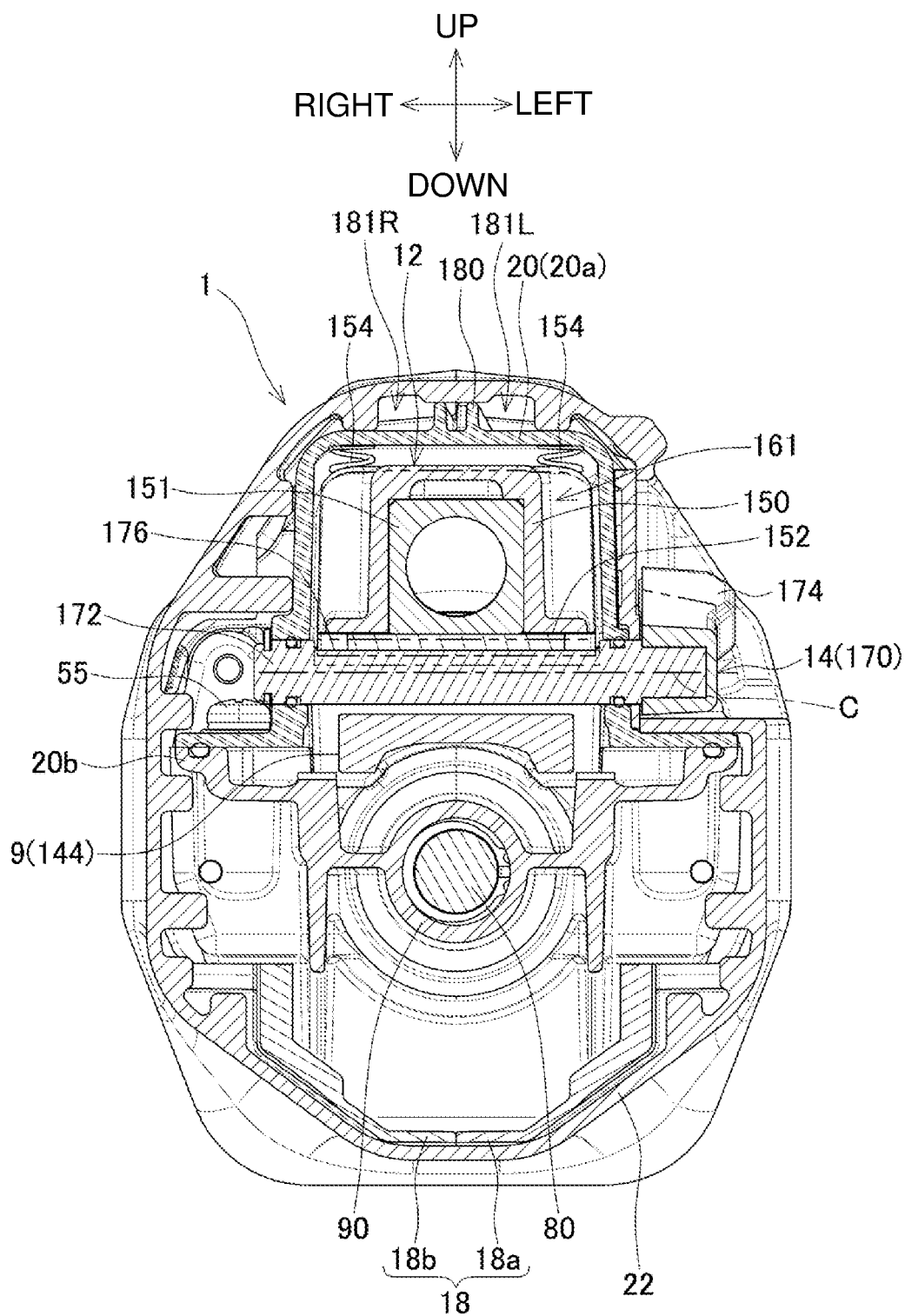
FIG. 4 is a cross-sectional view taken along line A-A in FIG. 3.

FIG. 1 is a perspective view of a reciprocating saw 1 according to a first embodiment as viewed from the upper left front. FIG. 2 is a central longitudinal sectional view of the structure shown in FIG. 1. FIG. 3 is a partial enlarged view of FIG. 2. FIG. 4 is a cross-sectional view taken along line A-A in FIG. 3.

The reciprocating saw 1 includes a body housing 2, a motor 3, a fan 4, a reciprocation converter 5, a slider 6 as an output section, a guide shoe 8, a counterweight 9, an orbital unit 12, an orbital switcher 14, and a release unit 201.

The body housing 2 is a support frame that directly or indirectly holds the components.

The body housing 2 includes a motor housing 18, a power transmission housing 20, and a cover 22.

The motor housing 18 has a cylindrical front portion. The motor housing 18 has a looped rear portion. The motor housing 18 is formed from plastic.

The motor housing 18 holds the motor 3 in its upper front portion. The motor 3 includes a motor case 3a. The motor case 3a defines an outer wall of the motor 3. The motor case 3a is cylindrical. The motor case 3a has an open front portion. The motor housing 18 is connected to the power transmission housing 20 with the motor case 3a.

The motor housing 18 is halved into a left motor housing 18a and a right motor housing 18b.

The left motor housing 18a has multiple screw bosses 24. The right motor housing 18b has multiple screw holes (not shown). The screw holes are aligned with the screw bosses 24. Multiple screws 28 are placed through the screw bosses 24 and the screw holes laterally, fastening the right motor housing 18b to the left motor housing 18a.

The looped rear portion of the motor housing 18 extends vertically and defines a first grip 30. The first grip 30 is grippable by a user.

The motor housing 18 has multiple inlets 31 in the portion of the looped rear portion that faces the front surface of the first grip 30. Each inlet 31 extends laterally. The inlets 31 are aligned vertically. The motor 3 is located in front of the inlets 31.

The first grip 30 holds a main switch 32 in its upper portion.

The main switch 32 includes a trigger 33 and a main switch body 34.

The trigger 33 is exposed at the upper front of the first grip 30. The user pulls the trigger 33 with a fingertip to move the trigger 33 rearward. The trigger 33 is in front of the main switch body 34. The trigger 33 is connected to the main switch body 34.

The main switch body 34 is located in the upper portion of the first grip 30. The main switch body 34 is turned on or off in response to an operation on the trigger 33. The main switch body 34 is turned on when the pull of the trigger 33 reaches or exceeds a predetermined amount. The main switch body 34 outputs a signal (e.g., a resistance) that varies in accordance with the pull reaching or exceeding the predetermined amount.

The trigger 33 turns on or off the motor 3 through the main switch body 34. The trigger 33 is a switch for turning on or off the motor 3.

A lock-off button 35 is located above the trigger 33. The lock-off button 35 is a laterally elongated plate.

The lock-off button 35 has its right and left portions exposed from the motor housing 18. The lock-off button 35 is slidable rightward when the left portion is pressed. The lock-off button 35 is slidable leftward when the right portion is pressed.

The lock-off button 35 slid to a right position prevents the trigger 33 from being pulled. The motor 3 cannot be turned on in this state. The lock-off button 35 slid to a left position permits the trigger 33 to be pulled. The motor 3 can be turned on in this state.

A speed switching dial 36 is located in front of the lock-off button 35. The speed switching dial 36 is a rotatable disk extending vertically and laterally. The speed switching dial 36 has its upper portion exposed from the motor housing 18.

The speed switching dial 36 outputs a signal corresponding to its rotational position (angle).

The motor housing 18 holds a controller 40 below the motor 3. The controller 40 includes a control circuit board 42 and a controller case 44.

The control circuit board 42 controls the motor 3. The control circuit board 42 includes a microcomputer and multiple (six or twelve) switching elements.

The controller case 44 is a metal (aluminum) box without a lid. The controller case 44 accommodates the control circuit board 42. The control circuit board 42 is covered with a mold layer 46 of a material injected in the controller case 44.

The controller 40 is located below the motor 3. The controller 40 extends diagonally. More specifically, the controller 40 extends diagonally upward toward the front.

The controller case 44 has its front surface aligned with a front wall 18W of a lower front portion 18F of the motor housing 18. The motor housing 18 holds the controller 40.

The motor housing 18 has multiple lower rear outlets 48 in its lower front portion 18F. Each lower rear outlets 48 extends laterally. The lower rear outlets 48 are aligned in the front-rear and lateral directions.

The lower rear outlets 48 are located downward from a portion holding the controller 40 in the motor housing 18. More specifically, the lower rear outlets 48 are opposite to the fan 4 from the controller 40 in the motor housing 18.

The space between the front surface of the controller case 44 and the front wall 18W serves as an outlet passage allowing a cooling outlet blow WD to pass from the fan 4. The outlet blow WD exits through the lower rear outlets 48.

The motor housing 18 has a lower rear portion 18E recessed upward from the lower front portion 18F.

The lower rear portion 18E receives a battery mount 50.

The lower rear portion 18E has an opening.

The battery mount 50 holds a terminal retainer 52. The terminal retainer 52 has a box-like front portion. The terminal retainer 52 has a plate-like rear portion. The terminal retainer 52 covers the opening in the lower rear portion 18E of the motor housing 18. The terminal retainer 52 is exposed through the opening. The terminal retainer 52 holds multiple terminal plates (not shown).

The battery mount 50 receives a battery 54 that is slid forward from the rear. The mounted battery 54 is electrically connected to the terminal retainer 52 (terminal plates). The battery 54 powers the motor 3.

The power transmission housing 20 supports the components of the reciprocation converter 5, the slider 6, the counterweight 9, the orbital unit 12, and the orbital switcher 14 directly or indirectly. The power transmission housing 20 is formed from metal. The power transmission housing 20 is connected to the front of the motor housing 18.

The power transmission housing 20 is halved, and is a cylinder having openings in its front and rear ends. The power transmission housing 20 houses the reciprocation converter 5. The power transmission housing 20 is thus also a converter housing.

The power transmission housing 20 includes an upper power transmission housing 20a, a lower power transmission housing 20b, and a bearing retainer 114.

The upper power transmission housing 20a is fastened to the lower power transmission housing 20b with multiple screws 55 (FIG. 4) extending vertically.

The lower power transmission housing 20b has its rear end fastened to the front end of the motor housing 18 with multiple screws (not shown) extending in a front-rear direction from the motor case 3a.

The cover 22 is cylindrical. The cover 22 is externally mounted on the power transmission housing 20. The cover 22 is outward from the power transmission housing 20. The cover 22 is elastic (rubbery). The cover 22 is located outside the power transmission housing 20 as a thermally or electrically insulating cover.

The cover 22 may not be a component of the body housing 2. The cover 22 may be formed from plastic.

The rear end of the cover 22 covers the front end of the motor housing 18. The cover 22 is continuous with the motor housing 18 on the outer surface.

Figure 9:
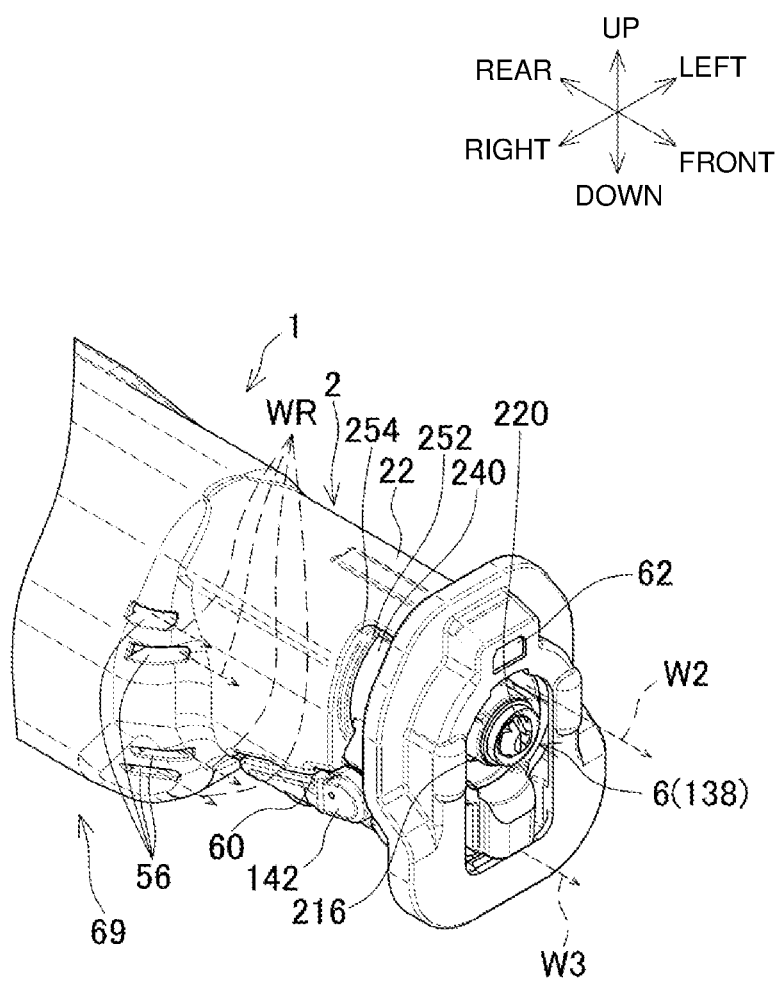
FIG. 9 is a perspective view of a front portion of the reciprocating saw in FIG. 1 as viewed from the upper right front.

The cover 22 has multiple body outlets 56 in the right and left portions in its middle portion (FIGS. 1 and 9). Each left body outlet 56 extends in the front-rear direction. Each right body outlet 56 (FIG. 9) extends in the front-rear direction. The multiple body outlets 56 are aligned vertically. The body outlets 56 are located frontward from the fan 4.

The cover 22 has an orbital switching lever hole 58 in its left rear portion (FIG. 1). The orbital switching lever hole 58 extends in the vertical and front-rear directions.

A lower portion of the cover 22, or more specifically, a front portion of the body housing 2, serves as a second grip 60. The second grip 60 is grippable by a user.

At least the number of sections in the body housing 2, the size of each section in the body housing 2, or the shape of each section in the body housing 2 may be modified variously. For example, the rear portion of the motor housing 18 may be a separate handle housing. The battery mount 50 may be separate from the motor housing 18.

A lamp 62 is located between the upper front portion of the power transmission housing 20 and the upper front portion of the cover 22. The lamp 62 includes a light-emitting diode (LED) board. The LED board receives an LED.

The lamp 62 emits light forward. The lamp 62 can illuminate the area around the cutting position in front of the slider 6.

The motor 3, the main switch body 34, the speed switching dial 36, the terminal retainer 52 (terminal plates), and the lamp 62 each are electrically connected to the control circuit board 42 with multiple lead wires (not shown).

The portion of the motor housing 18 holding the motor 3 (the outside portion of the motor 3), the power transmission housing 20, the components held by these housings, and the cover 22 are included a body 69 of the reciprocating saw 1.

The motor 3 is an electric motor. The motor 3 is a brushless motor. The motor 3 is driven with direct current (DC).

The motor 3 includes the motor case 3a, a stator 71, and a rotor 72.

The motor case 3a is held on the motor housing 18.

The stator 71 includes multiple (six) coils 73. The stator 71 is cylindrical.

A sensor board 75 is fixed to the stator 71. The sensor board 75 receives multiple (three) magnetic sensors on its rear surface. Each magnetic sensor receives a rotation detection signal indicating the rotational position of the rotor 72 to obtain the rotational state of the rotor 72. The sensor board 75 and the control circuit board 42 are electrically connected to each other with multiple (six) lead wires (signal lines, not shown). The signal lines extends through the lower front portion 18F of the motor housing 18.

A coil connector 77 is located at the stator 71. The coil connector 77 serves as a contact for electrically connecting the coils 73 to one another in a predetermined manner. The coil connector 77 receives first ends of multiple (three) lead wires (power supply lines, not shown). The three power supply lines are used for three phases. Each power supply line extends through the lower front portion 18F of the motor housing 18. Each power supply line has a second end connected to the control circuit board 42.

The rotor 72 is located inside the stator 71. The motor 3 is an inner-rotor motor.

The rotor 72 includes a motor shaft 80, a rotor core 82, multiple (four) permanent magnets 84, and a sleeve 86.

The motor shaft 80 is cylindrical, and extends in the front-rear direction. The motor shaft 80 is formed from metal. The motor shaft 80 rotates on its axis. The motor shaft 80 has its front end extending into the rear end of the power transmission housing 20. The motor shaft 80 receives a pinion gear 80a on its front end. The pinion gear 80a includes multiple teeth.

The rotor core 82 is cylindrical. The rotor core 82 has an axis extending in the front-rear direction. The rotor core 82 includes multiple steel plates stacked on one another in the front-rear direction. Each steel plate extends in the vertical and lateral directions. The rotor core 82 is fixed on the outer surface of the motor shaft 80.

Each permanent magnet 84 is a plate. The four permanent magnets 84 are circumferentially arranged in the rotor core 82 to alternate in polarity. The four permanent magnets 84 are not in contact with one another.

The sleeve 86 is a metal (brass) ring member. The sleeve 86 is fixed to the front of the rotor core 82 and the front of the permanent magnets 84, and is fixed on the motor shaft 80. The sleeve 86 fixed to the permanent magnets 84 can prevent the permanent magnets 84 from slipping off the motor shaft 80.

A motor front bearing 88 is located in front of the sleeve 86. The motor front bearing 88 surrounds the front portion of the motor shaft 80. The motor front bearing 88 supports the motor shaft 80 in a manner rotatable on the axis.

The motor front bearing 88 is held on the rear portion of the lower power transmission housing 20b.

A motor rear bearing 92 surrounds the rear end of the motor shaft 80. The motor rear bearing 92 supports the motor shaft 80 in a manner rotatable on the axis. The motor rear bearing 92 is held on the motor case 3a.

The fan 4 is located in the middle portion of the motor shaft 80, behind the motor front bearing 88, and in front of the sleeve 86. The fan 4 is a centrifugal fan with multiple blades. The fan 4 rotates and forces air radially outward. The fan 4 is fixed to the motor shaft 80 integrally to rotate together. The fan 4 is located on the motor shaft 80. The fan 4 is held on the motor housing 18 with the rotor 72 and the lower power transmission housing 20b.

The lower power transmission housing 20b is in front of the fan 4.

The upper end of the air passage (lower air passage) defined between the front surface of the controller case 44 and the front wall 18W of the lower front portion 18F of the motor housing 18 is located below the fan 4.

The fan 4 may be a component of the motor 3.

Figure 5:
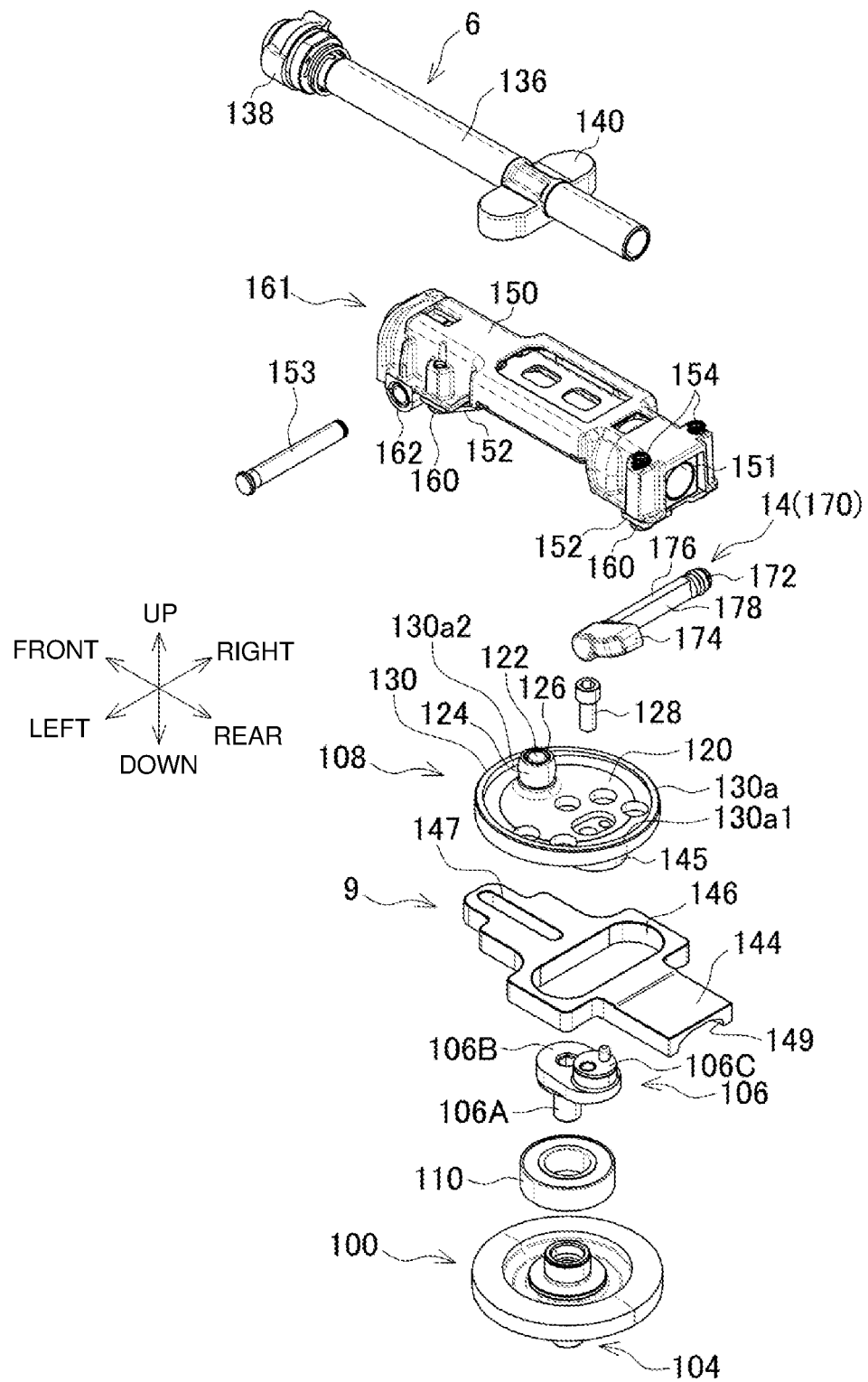
FIG. 5 is a partially exploded perspective view of a reciprocation converter in FIG. 2 and its surrounding components as viewed from above.
Figure 6:
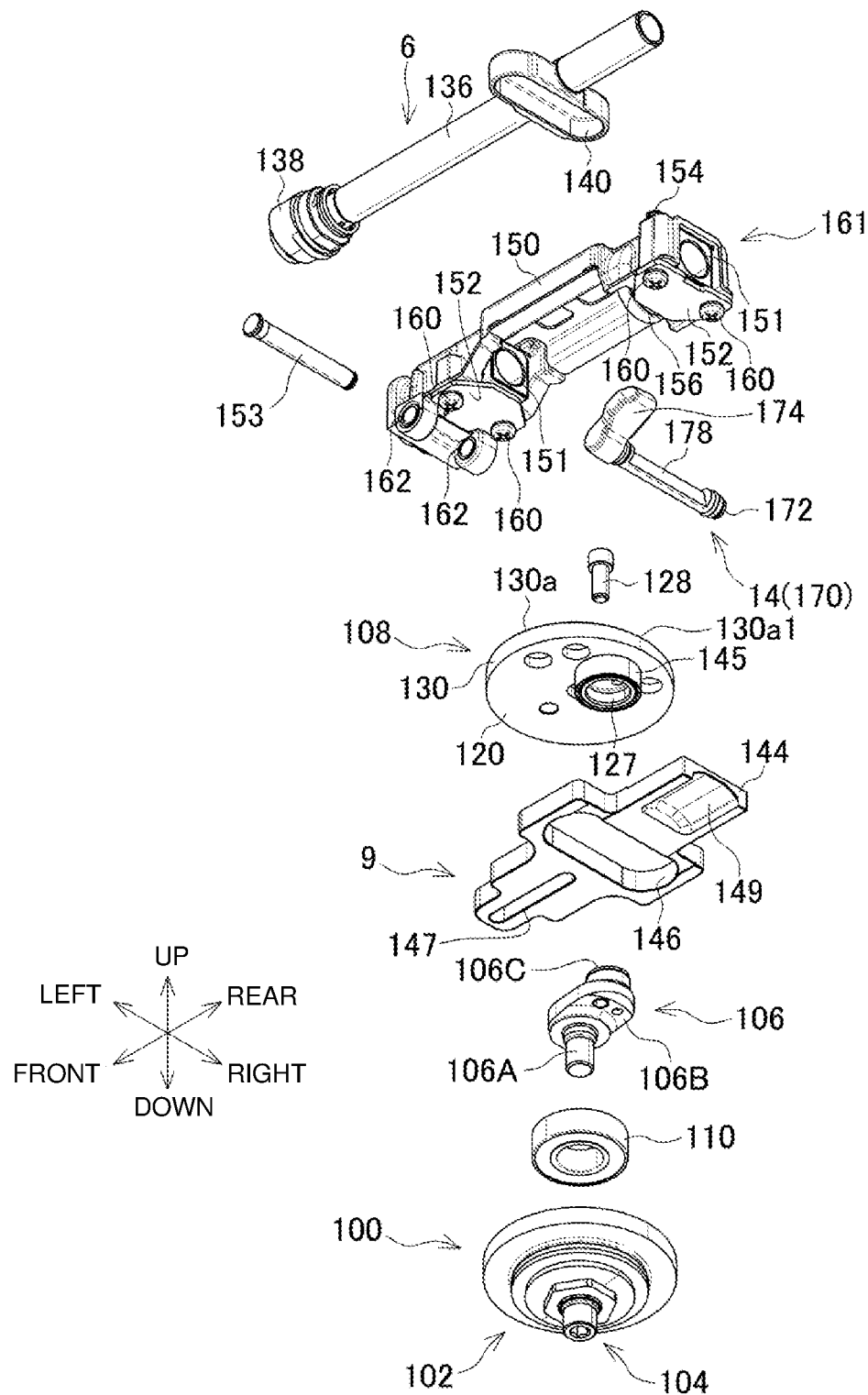
FIG. 6 is a partially exploded perspective view of the reciprocation converter in FIG. 2 and its surrounding components as viewed from below.
Figure 7:
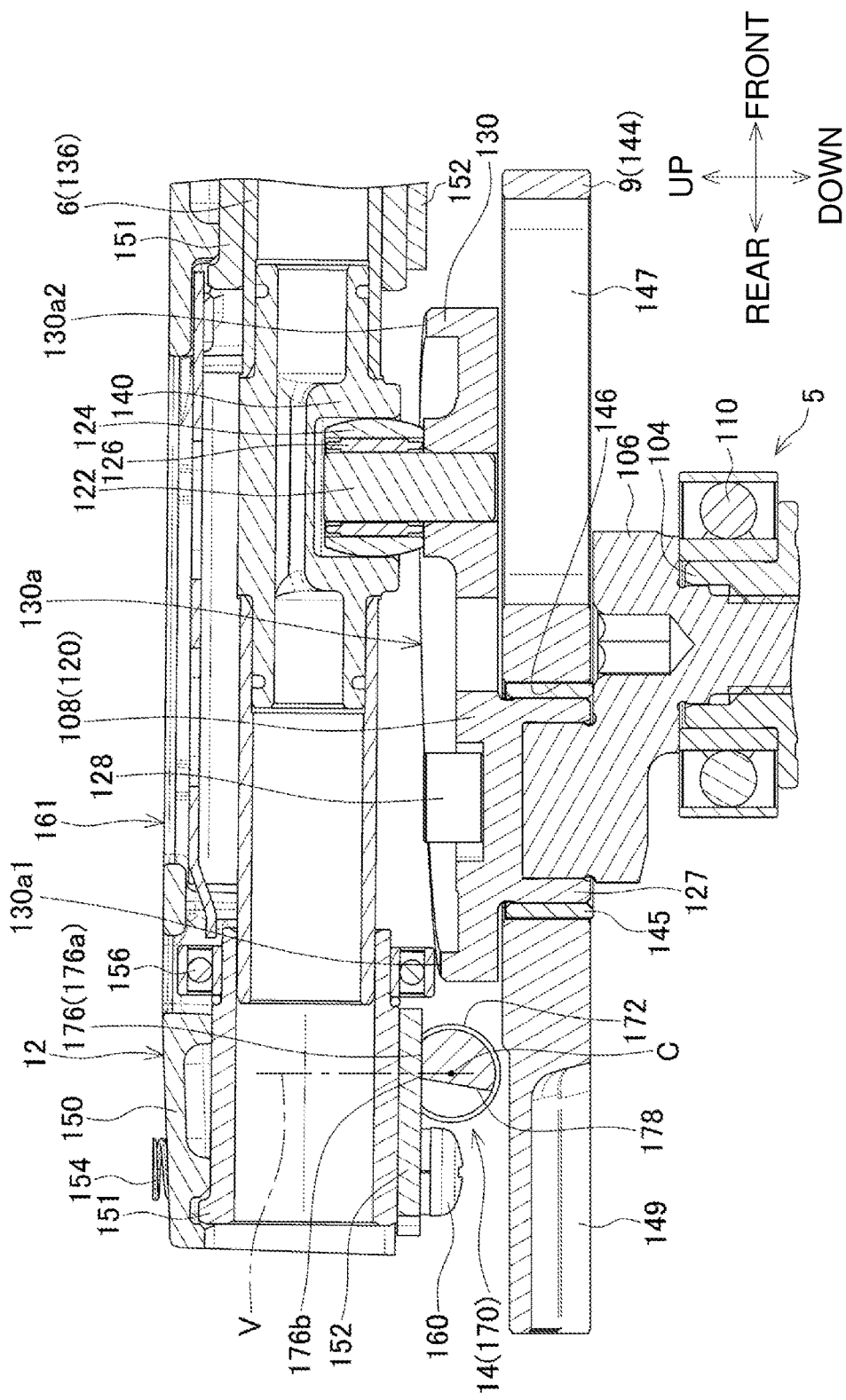
FIG. 7 is a central longitudinal sectional view of part of the reciprocation converter in FIG. 2 and its surrounding components.
Figure 8:
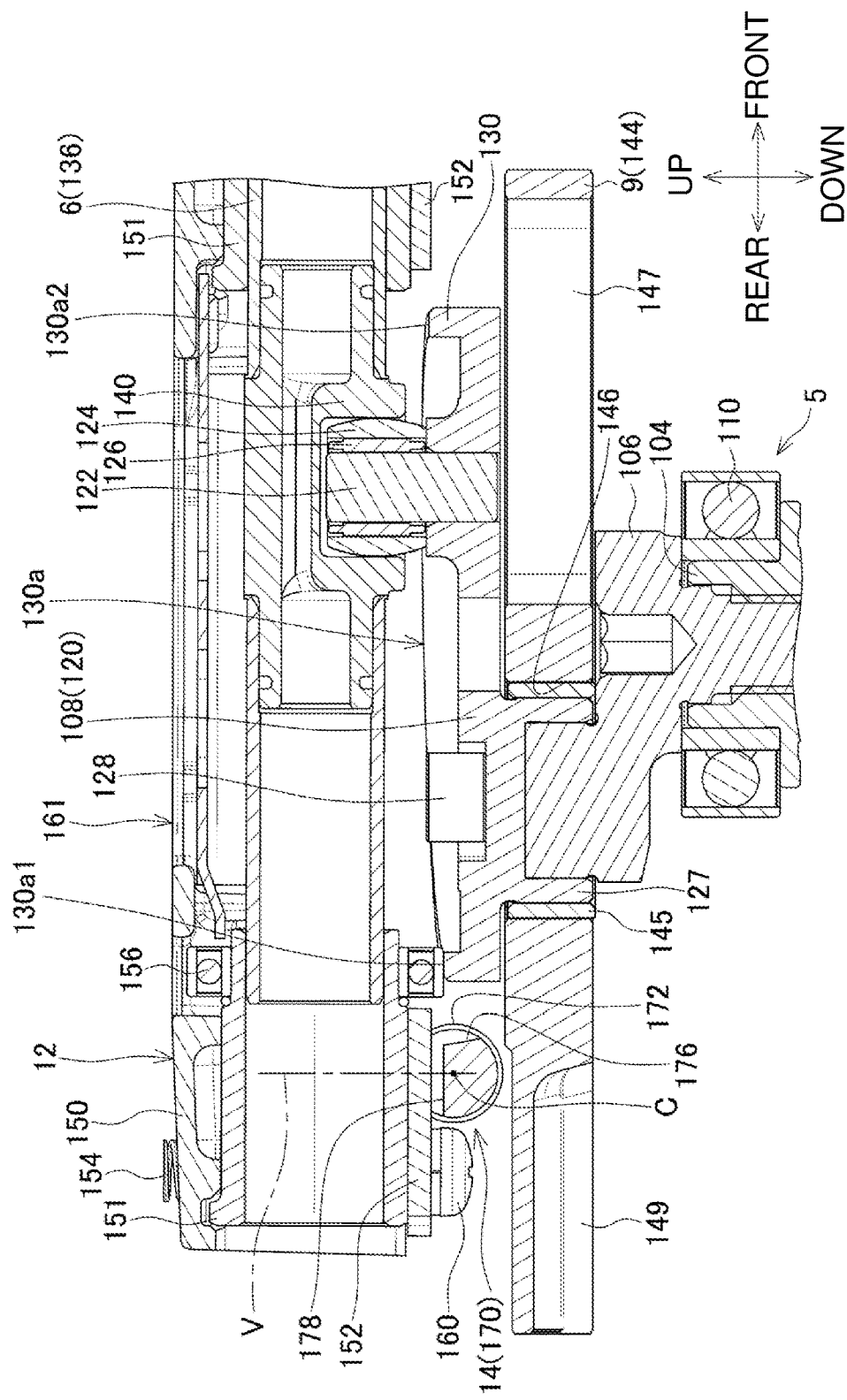
FIG. 8 is a central longitudinal sectional view of the reciprocation converter, with a knob of an orbital switching lever pressed forward in the state in FIG. 7.

FIGS. 5 and 6 each are a partially exploded perspective view of the reciprocation converter 5 and its surrounding components as viewed from above or below. FIG. 7 is a central longitudinal sectional view of part of the reciprocation converter 5 and its surrounding components. FIG. 8 is a central longitudinal sectional view of the part of the reciprocation converter 5, with a knob 174 of an orbital switching lever 170 pressed forward (refer to the two-dot chain line in FIG. 1) in the state in FIG. 7.

The reciprocation converter 5 is a power transmission that transmits power from the motor 3 to the slider 6. The reciprocation converter 5 transmits rotational motion of the motor shaft 80 of the motor 3 to the slider 6. The reciprocation converter 5 is held on the power transmission housing 20. The reciprocation converter 5 is located between the motor 3 and the slider 6.

The reciprocation converter 5 includes a bevel gear 100, a torque limiter 102, a countershaft 104, a crank base 106, and a crank cam 108.

The bevel gear 100 is a disk extending in the front-rear and lateral directions. The bevel gear 100 includes bevel teeth (not shown) on the periphery of its upper surface. The bevel gear 100 meshes with the pinion gear 80a.

The bevel gear 100 rotates on a vertical rotation axis including its center in the front-rear and lateral directions.

The torque limiter 102 is located between the bevel gear 100 and the countershaft 104.

The torque limiter 102 transmits power from the bevel gear 100 to the countershaft 104. The torque limiter 102 includes upper and lower flat plates in close contact with each other under an urging force from an elastic member. In response to an excessive load from the countershaft 104, the flat plates separate from each other against the urging force. This protects the bevel gear 100 and the motor 3 under the load.

The countershaft 104 is cylindrical and extends vertically.

The countershaft 104 is supported by an upper countershaft bearing 110 and a lower countershaft bearing 112 in a manner rotatable coaxially with the bevel gear 100 on the rotation axis (FIGS. 2 and 3).

The upper countershaft bearing 110 is held on the lower power transmission housing 20b.

The lower countershaft bearing 112 is a needle bearing. The lower countershaft bearing 112 is held in a dish-shaped bearing retainer 114 (FIGS. 2 and 3). The bearing retainer 114 is fastened to the lower power transmission housing 20b with multiple screws 116 (one is shown in FIGS. 2 and 3) extending vertically.

The crank base 106 is crank-shaped.

The crank base 106 includes a cylindrical part 106A on the bottom. The cylindrical part 106A is screwed to the upper portion of the countershaft 104.

The crank base 106 includes a plate 106B extending in the front-rear and lateral directions in the middle.

The crank base 106 includes an eccentric disk 106C on its top. The center of the eccentric disk 106C is off the central axis of the lower part of the crank base 106. The eccentric disk 106C extends in the front-rear and lateral directions.

The crank cam 108 includes a crank cam body 120, an eccentric pin 122, a convex roller 124, and a bearing 126.

The crank cam body 120 is a disk extending in the front-rear and lateral directions. The crank cam body 120 has a vertical central axis that is aligned with the rotation axis of the bevel gear 100. The crank cam body 120 has a coupler 127 on its bottom. The coupler 127 is cylindrical and protrudes downward from the other portion. The coupler 127 receives the eccentric disk 106C in the crank base 106 coupled with a screw 128. The crank cam body 120 also includes a cam 130 on the periphery of the upper surface of the crank cam body 120. The cam 130 protrudes upward from the adjacent portions. The cam 130 is annular as viewed from above. The cam 130 has a vertical length changing gradually in the circumferential direction (refer to FIGS. 7 and 8, for example). In other words, the upper surface of the cam 130 serves as a cam surface 130a. The cam surface 130a has a height that gradually changes from a lowest point 130a1 to a highest point 130a2.

The eccentric pin 122 is cylindrical and extends vertically. The lower portion of the eccentric pin 122 is received in a vertical hole in the crank cam body 120. The hole is radially off the central axis of the crank cam body 120.

The convex roller 124 is cylindrical. The convex roller 124 has an outer surface with a diameter increasing toward its vertically middle portion.

The convex roller 124 surrounds the upper portion of the eccentric pin 122 with the bearing 126 between them. The convex roller 124 is supported in a manner rotatable on a vertical rotation axis. The bearing 126 is a needle bearing.

The slider 6 includes a slider body 136 and a blade holder 138 as a tip tool holder. The slider 6 has its front end protruding from the front end of the power transmission housing 20.

The slider body 136 is cylindrical and extends in the front-rear direction. The slider body 136 has a convex roller receiver 140 in its rear portion. The convex roller receiver 140 is a bottomed elliptical cylinder extending laterally. The convex roller receiver 140 is open downward. The convex roller receiver 140 receives the convex roller 124.

In response to rotation of the crank cam 108, the convex roller 124 rotates eccentrically. The motion of the convex roller 124 includes a front-rear component that causes the slider body 136 to reciprocate in the front-rear direction through the convex roller receiver 140. The lateral component of the motion of the convex roller 124 is its relative motion within the convex roller receiver 140, and is not transmitted to the slider body 136.

The blade holder 138 holds a blade (not shown) as a tip tool. The blade holder 138 automatically holds a blade in response to the rear end of the blade being simply inserted into the blade holder 138 (quick attachment).

The blade holder 138 is larger than the slider body 136 in the vertical and lateral directions. The slider 6 is an output section. The blade is a tip tool. The blade is an elongated plate and extends in the front-rear direction when attached. The blade has an edge on a longer side. The edge includes saw teeth. The blade is attached with its edge facing downward. The blade may be attached with its edge facing upward. The blade may have edges on the two longer sides. The tip tool may be any tool other than a blade.

The guide shoe 8 is located adjacent to the blade attached to the blade holder 138.

The counterweight 9 is combined with the reciprocation converter 5.

The counterweight 9 includes a metal balancer 144 and a ring 145.

The balancer 144 is a plate extending in the front-rear and lateral directions. The balancer 144 has a long hole 146 extending laterally in the middle portion. The portion of the balancer 144 frontward from the long hole 146 is heavier than the portion rearward from the long hole 146.

The long hole 146 receives the coupler 127 in the crank cam 108 with the ring 145.

The portion of the balancer 144 frontward from the long hole 146 has a slit 147 extending in the front-rear direction. The slit 147 receives a pin 148. The pin 148 extends vertically. The lower portion of the pin 148 is held on the lower power transmission housing 20b.

The portion of the balancer 144 rearward from the long hole 146 has a recess 149 on its bottom. The recess 149 is recessed upward from the surrounding portion to avoid contact with the upper rear portion of the lower power transmission housing 20b (refer to FIG. 3).

The balancer 144 reciprocates in the front-rear direction as the crank cam 108 rotates. The coupler 127 is located opposite to the convex roller 124 from the center of the crank cam body 120. More specifically, the coupler 127 and the convex roller 124 are at an angle of about 175° to each other about the center of the crank cam body 120 in the front-rear and lateral directions. The portion of the balancer 144 frontward from the long hole 146 thus basically moves opposite to the movement of the slider 6 in the front-rear direction. The balancer 144 thus reduces the vibrations generated by the reciprocation of the slider 6. More specifically, the balancer 144 moves in the direction opposite to the backward and forward motion of the slider 6, and thus serves as a counterweight. The lateral component in the motion of the coupler 127 is its relative motion within the long hole 146, and is not transmitted to the balancer 144. The angle between the coupler 127 and the convex roller 124 may be 180° or any other angle.

The orbital unit 12 includes a slider support body 150, multiple (two) oilless bearings 151 as slider supports, multiple (two) plates 152, a slider support shaft 153, multiple springs 154 as elastic members, a bearing 156, and multiple screws 160.

The slider support body 150, the oilless bearings 151, the plates 152, the bearing 156, and the screws 160 are included in a cylindrical slider support 161. The bearing 156 and other components may be eliminated from the components of the slider support 161. At least one of the slider support shaft 153 or the springs 154 may be included in the components of the slider support 161.

The slider support body 150 is a metal box extending in the front-rear direction.

The slider support body 150 holds the oilless bearings 151 on its front and rear portions. The oilless bearings 151 have a square cross section.

The slider 6 extends through the oilless bearings 151 in a reciprocable manner.

The slider support body 150 has an opening in its lower middle portion, where the convex roller 124 and the convex roller receiver 140 can be located. The oilless bearings 151 are located in front of and behind the opening.

A rear plate 152 is fastened to a lower rear portion of the slider support body 150 below a rear oilless bearing 151 with (two right and left) screws 160 extending vertically. The rear plate 152 is formed from metal, and extends in the front-rear and lateral directions. The slider support body 150 holds the rear oilless bearing 151 from above. The rear plate 152 holds the rear oilless bearing 151 from below.

A front plate 152 is fastened to a lower front portion of the slider support body 150 below a front oilless bearing 151 with (two, or right and left) screws 160 extending vertically. The front plate 152 is formed from metal, and extends in the front-rear and lateral directions. The slider support body 150 holds the front oilless bearing 151 from above. The front plate 152 holds the front oilless bearing 151 from below.

The plates 152 and the screws 160 may be eliminated.

The slider support body 150 has right and left shaft holes 162 extending laterally on its front bottom. The peripheries of the shaft holes 162 are fixed to the upper power transmission housing 20a.

The slider support shaft 153 extends through the right and left shaft holes 162. The slider support 161 is pivotable about the slider support shaft 153.

The springs 154 are located on the right and left of the rear top of the slider support body 150. The springs 154 extend vertically. The upper end of each spring 154 is held on the rear inner surface of the upper power transmission housing 20a.

The bearing 156 is located behind the lower opening in the slider support body 150 and in front of the plate 152. The bearing 156 is a ball bearing.

The inner ring of the bearing 156 is held on the outer surface of the oilless bearing 151. The outer ring of the bearing 156 can be in contact with the cam 130 in the crank cam 108.

The orbital switcher 14 includes an orbital switching lever 170 as an orbital switch. The orbital switching lever 170 includes a lever body 172 as a shaft and the knob 174.

The lever body 172 is a rod-like shaft extending laterally.

The orbital switching lever 170 is held on the upper power transmission housing 20a in a manner rotatable on a central axis C (refer to FIGS. 7 and 8) of the lever body 172. The central axis C of the lever body 172 is parallel to the plate 152 to be in contact with the lever body 172.

The lever body 172 has a first flat surface 176 and a second flat surface 178. The first flat surface 176 is a support flat surface extending laterally. The second flat surface 178 is a surface for a second orbital mode extending laterally. The first flat surface 176 and the second flat surface 178 are at a predetermined angle (about 100° in this example) to each other. The distance from the central axis C to the first flat surface 176 is larger than the distance from the central axis C to the second flat surface 178.

In a first state of orbital (first orbital mode) as in FIG. 7, the first flat surface 176 of the orbital switching lever 170 can be in contact with the rear bottom (rear plate 152) of the slider support 161. When the orbital switching lever 170 is in contact with the plate 152, the first flat surface 176 extends, in the front-rear direction, on both sides of an imaginary perpendicular plane V (vertical plane, refer to FIG. 7) including the central axis C and perpendicular to the first flat surface 176. More specifically, the first flat surface 176 extends through the perpendicular plane V. In other words, the first flat surface 176 has a first portion 176a frontward from the central axis C (perpendicular plane V) and a second portion 176b rearward from the central axis C (perpendicular plane V). FIG. 4 is a cross-sectional view taken along the perpendicular plane V.

In a second state of orbital (second orbital mode) as in FIG. 8, the second flat surface 178 of the orbital switching lever 170 faces the rear bottom of the slider support 161 across a space. In this case, the bearing 156 in the orbital unit 12 comes in contact with the cam surface 130a of the cam 130 throughout the circumference of the cam surface 130a.

In the second orbital mode, the bearing 156 comes in contact with the lowest point 130a1 on the cam surface 130a (refer to FIG. 8) under the downward urging force from the springs 154. The second flat surface 178 of the lever body 172 remains separate from the rear bottom of the slider support 161 in this state. This causes the slider support 161, the slider 6, and the blade to face upward (toward the front). The bearing 156 also comes in contact with the highest point 130a2 on the cam surface 130a. The bearing 156 is then pushed upward by the cam surface 130a against the urging force from the springs 154, causing the slider support 161, the slider 6, and the blade to face downward (toward the front). The height of the portion of the cam surface 130a between the lowest point 130a1 and the highest point 130a2 in the circumferential direction changes gradually. Thus, rotation of the crank cam 108 moves the bearing 156 up and down as the bearing 156 travels relatively on the cam surface 130a. The slider support 161, the slider 6, and the blade thus repeatedly face upward toward the front, align with the front-rear direction, face downward toward the front, and align in the front-rear direction. This causes an elliptical orbital action of the blade holder 138.

The slider 6 is supported on the first portion 176a and the second portion 176b of the first flat surface 176. The slider 6 supported on the surfaces thus restricts rotation of the lever body 172 on the central axis C upon an operation other than an operation on the knob 174. This allows stable switching of the on-off state or the degree of orbital action with the lever body 172 having the first flat surface 176 and also simplifies the structure for switching the orbital action.

Orbital action is associated with the reciprocation of the slider 6 in accordance with the circumferential distribution of the height of the cam surface 130a in the crank cam 108. When moving forward, the slider 6 faces upward toward the front. When switching the moving direction from forward to backward (or passing near the switching point), the slider 6 aligns with the front-rear direction. When moving backward, the slider 6 faces downward toward the front. When switching the moving direction from backward to forward (or passing near the switching point), the slider 6 aligns with the front-rear direction. The height distribution of the cam surface 130a is adjusted accordingly.

With the slider support 161 and the slider 6 facing either upward or downward, the convex roller 124 allows reciprocation of the slider 6 appropriately.

In the first orbital mode, the rear portion of the slider support 161 is lifted by the first flat surface 176 of the lever body 172. The bearing 156 thus does not come in contact with the lowest point 130a1 and the adjacent portions on the cam surface 130a. The slider 6 thus faces less upward toward the front than in the second orbital mode. In contrast, the bearing 156 comes in contact with the highest point 130a2 and the adjacent portions on the cam surface 130a.

The bearing 156 comes in contact with the cam 130 on about half the cam 130 and does not come in contact with the cam 130 on the other half due to the first flat surface 176 of the lever body 172. Thus, when moving backward, the slider 6 aligning with the front-rear direction faces downward toward the front, and then aligns again with the front-rear direction (or causes the semielliptical orbital action of the blade holder 138) in the same manner as in the second orbital mode. However, when moving forward, the slider 6 remains mostly in alignment with the front-rear direction. In the first orbital mode, the blade holder 138 thus performs semielliptical orbital action.

In the first orbital mode, the blade holder 138 performs orbital action in a range of about half the rotation (first range). In the second orbital mode, the blade holder 138 performs orbital action throughout the rotation range (second range), which is wider than the range of about half the rotation (first range). Thus, the slider 6 is supported further stably on the first flat surface 176 in the first orbital mode in which the orbital action is performed in the first range.

In the first orbital mode, no orbital action may be performed throughout the rotation range. For example, elliptical orbital action may be performed on one-quarter of the rotation and may not be performed on the remaining three-quarters of the rotation. The range in which orbital action is performed (the on-off ratio of orbital action) may be changed in this manner.

Similarly, in the second orbital mode, orbital action may not be performed in a part of the rotation range. More specifically, the range in which orbital action is performed may be changed variously with the range of orbital action in the first orbital mode (first range) being smaller than the range of orbital action in the second orbital mode (second range).

The knob 174 crosses the lever body 172. For example, the knob 174 crosses the lever body 172 orthogonally.

The knob 174 is located on the left of the power transmission housing 20 and the cover 22. The knob 174 is exposed outside. The knob 174 is located in the orbital switching lever hole 58 in the cover 22.

The user operates the knob 174 to rotate the orbital switching lever 170 on the central axis C to switch between the orbital modes.

Figure 10:
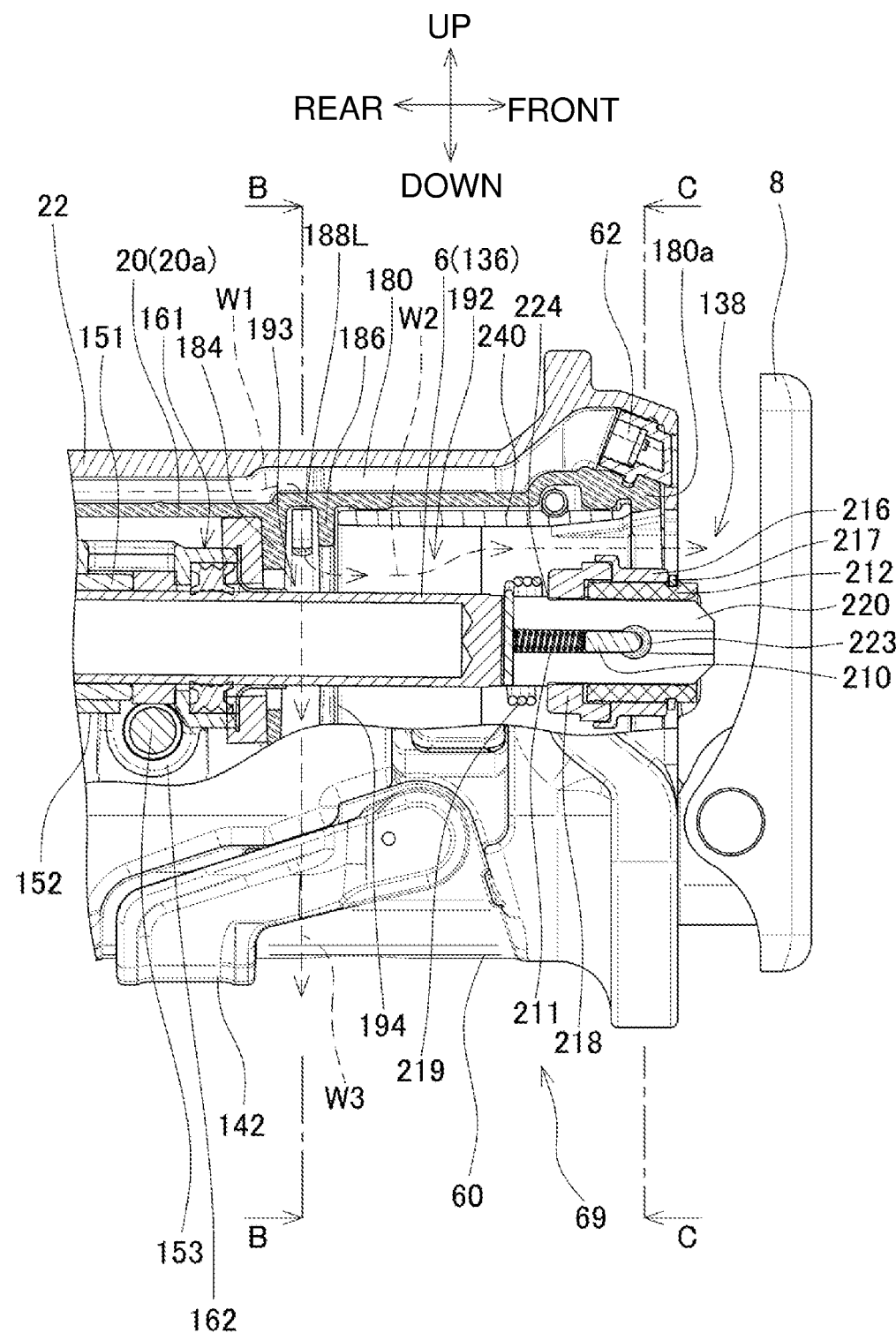
FIG. 10 is a partial enlarged view of a front part of FIG. 2.
Figure 11:
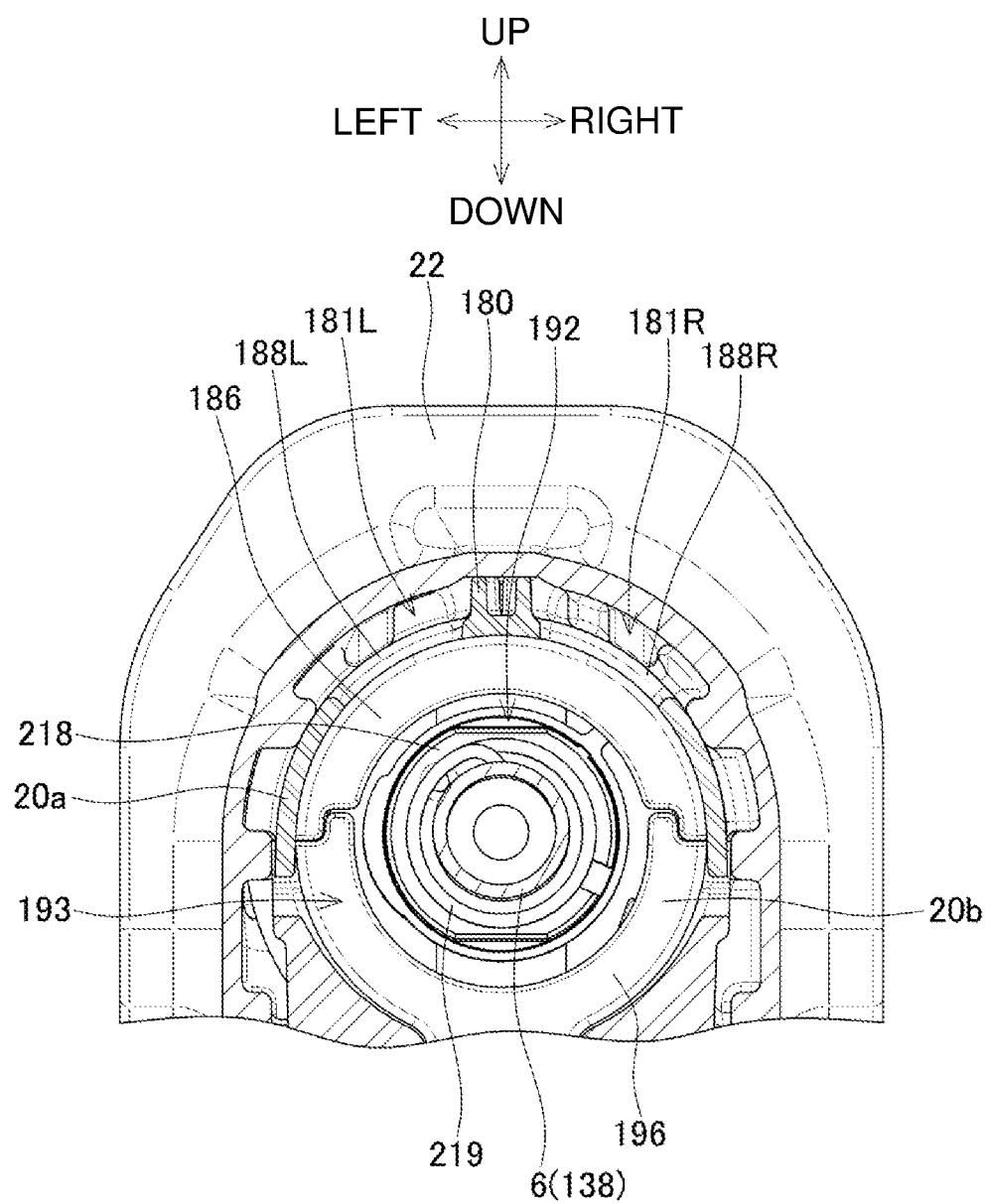
FIG. 11 is a cross-sectional view taken along line B-B in FIG. 10.
Figure 12:
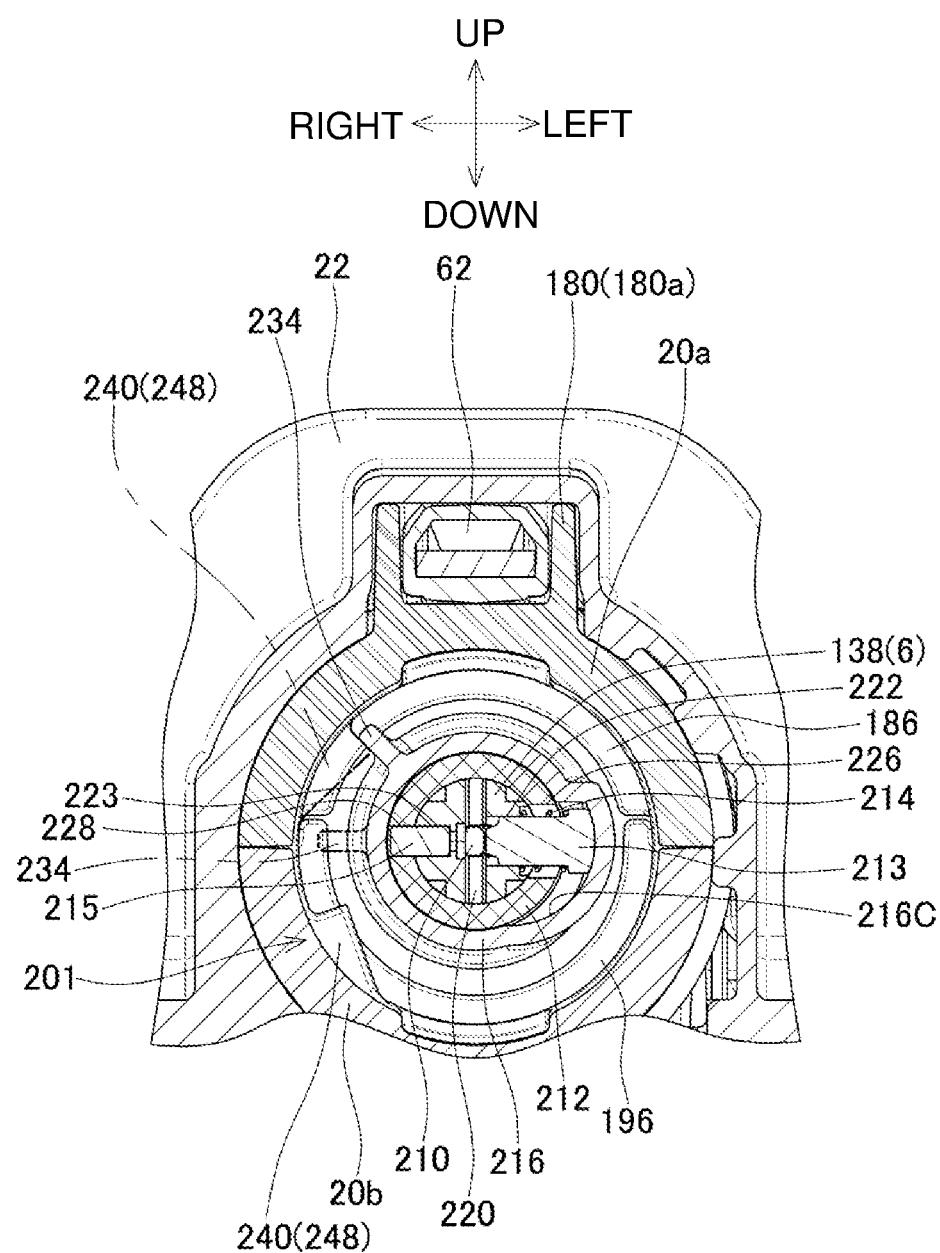
FIG. 12 is a cross-sectional view taken along line C-C in FIG. 10.
Figure 13:
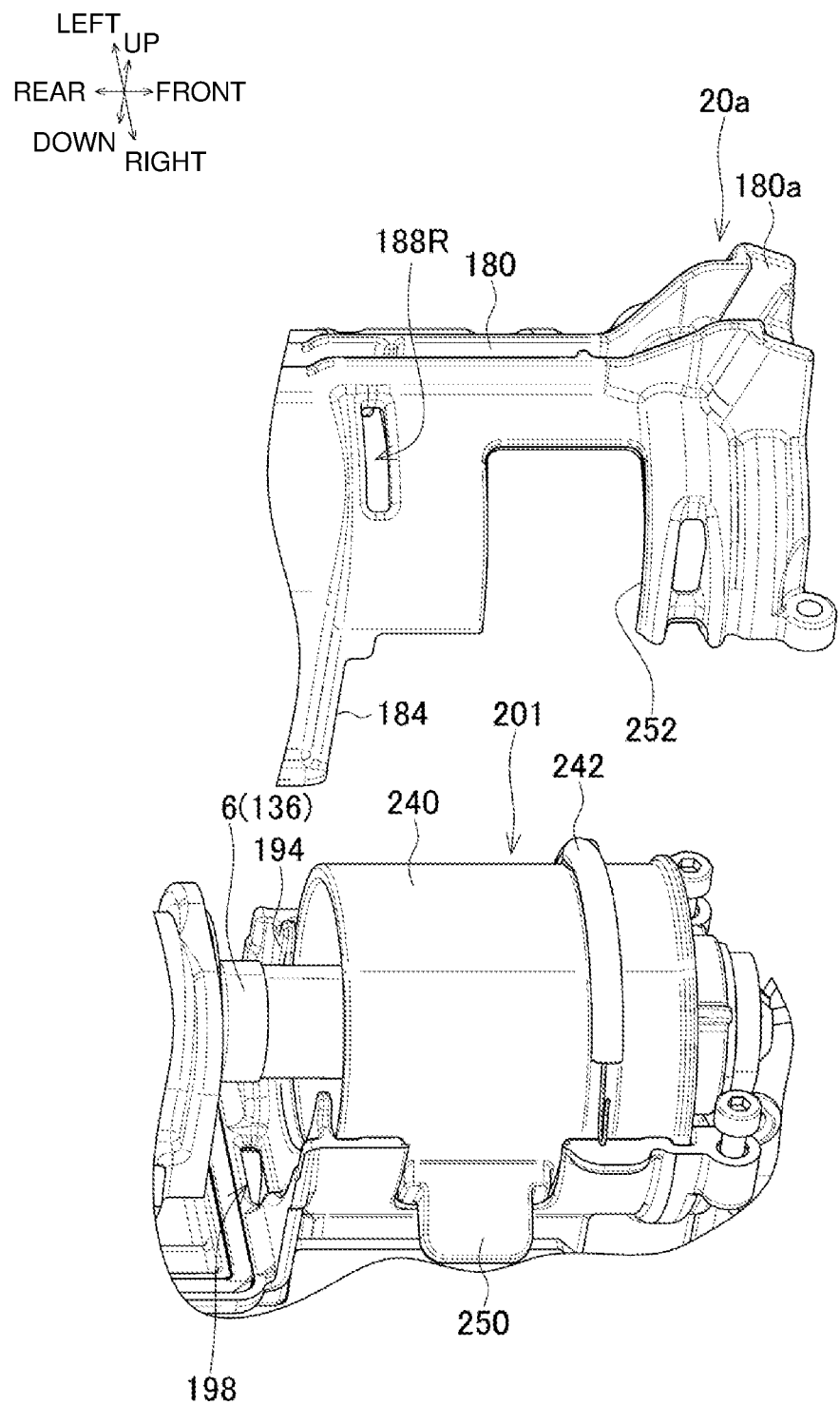
FIG. 13 is a partially exploded perspective view of an upper front portion of the reciprocating saw in FIG. 1.
Figure 14:
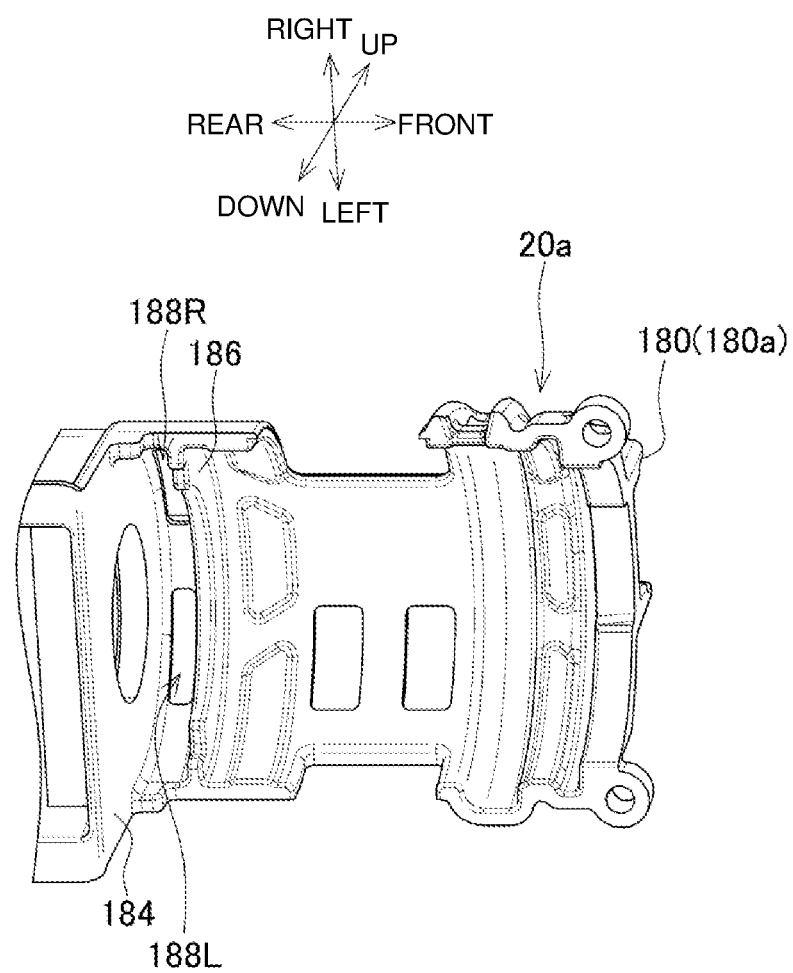
FIG. 14 is a perspective view of a front portion of an upper power transmission housing of the reciprocating saw in FIG. 1 as viewed from below.

FIG. 9 is a perspective view of a front portion of the reciprocating saw 1 as viewed from the upper right front. FIG. 10 is an enlarged partial view of a front portion in FIG. 2. FIG. 11 is a cross-sectional view taken along line B-B in FIG. 10. FIG. 12 is a cross-sectional view taken along line C-C in FIG. 10. FIG. 13 is a partially exploded perspective view of an upper front portion of the reciprocating saw 1 as viewed from the above. FIG. 14 is a perspective view of a front portion of the upper power transmission housing 20a as viewed from below. In FIG. 9, the front plate of the guide shoe 8 is not shown.

A clearance is left between the left part of the power transmission housing 20 and the left part of the cover 22 to allow passage of a cooling outlet blow WL from the fan 4. The outlet blow WL exits through the left body outlets 56 (FIG. 1).

Similarly, a clearance is left between the right part of the power transmission housing 20 and the right part of the cover 22 to allow passage of a cooling outlet blow WR from the fan 4. The outlet blow WR exits through the right body outlets 56 (FIG. 9).

A ridge portion 180 is located on the top of the upper power transmission housing 20a. The ridge portion 180 includes a pair of ridges extending in the front-rear direction. The ridge portion 180 includes a pair of walls protruding upward from the adjacent portions. The front end of the ridge portion 180 receives a housing 180a of the lamp 62. A lead wire connecting the lamp 62 to the control circuit board 42 extends through the ridge portion 180. The ridge portion 180 houses the lead wire for the lamp 62.

The upper end of the ridge portion 180 is in contact with the upper inner surface of the cover 22. Clearances 181L and 181R, each as a first passage on the right or left of the ridge portion 180, are left between the upper portion of the upper power transmission housing 20a and the upper portion of the cover 22. The clearances 181L and 181R allow passage of an outlet blow W1 from the fan 4. Although FIGS. 2, 3, and 10 show the outlet blow W1 overlapping the ridge portion 180 for ease of explanation, the outlet blow W1 mostly flows through the clearances 181L and 181R.

The first passage for the outlet blow may not separate into right and left passages or may separate into three or more passage.

The upper power transmission housing 20a has a front wall 184 extending vertically and laterally in its front portion. The front wall 184 is in front of the slider support 161. The front wall 184 has a hole receiving the slider body 136 through the front wall 184.

The upper power transmission housing 20a has a wall 186 in front of the front wall 184. The wall 186 protrudes from the upper inner surface of the upper power transmission housing 20a downward from the adjacent portions. The wall 186 is a semicircular arc strip as viewed from rear and surrounds the slider 6.

The upper power transmission housing 20a has a left hole 188L and a right hole 188R between the front wall 184 and the wall 186. The left hole 188L is on the left of the ridge portion 180. The right hole 188R is on the right of the ridge portion 180.

The outlet blow W1 passing through the clearance 181L enters the left hole 188L from above and flows forward until reaching in front of the left hole 188L. Without the wall 186, the outlet blow W1 entering the left hole 188L flows toward the blade holder 138 (refer to an outlet blow W2). Similarly, the outlet blow W1 passing through the clearance 181R enters the right hole 188R from above and flows forward until reaching in front of the right hole 188R. Without the wall 186, the outlet blow W1 entering the right hole 188R flows toward the blade holder 138.

In the reciprocating saw 1, the wall 186 separates the outlet blow W1 into the outlet blow W2 and an outlet blow W3. The outlet blow W2 flows toward the blade holder 138. The outlet blow W3 does not flow toward the blade holder 138. More specifically, the clearances 181L and 181R, each as the first passage, branch into the second passage 192 and the third passage 193 between the front wall 184 and the wall 186. The second passage 192 extends toward the blade holder 138 and extends frontward from the portion between the wall 186 and the slider 6. The third passage 193 extend downward from the portion between the front wall 184 and the wall 186.

The left hole 188L and the right hole 188R may not be separate right and left holes or may be separate three or more holes.

The lower power transmission housing 20b includes a lower wall 196. The lower wall 196 is vertically symmetrical with the wall 186. The lower wall 196 is a circular arc strip protruding upward from the lower inner surface of the lower power transmission housing 20b. The upper end of the lower wall 196 is continuous and in contact with the lower end of the wall 186.

The lower portion of the lower power transmission housing 20b has a lower front outlet 198 as a lower outlet (FIG. 13) behind the lower wall 196. The lower portion of the front wall 184 of the upper power transmission housing 20a is located behind the lower front outlet 198.

The space between the lower wall 196 and the slider 6, together with the space between the wall 186 and the slider 6, define the second passage 192.

The space behind the lower wall 196, together with the space between the front wall 184 and the wall 186, defines the third passage 193. The third passage 193 extends to the lower front outlet 198. The outlet blow W3 flows from the lower front outlet 198 through a clearance in the guide shoe 8 to the lower inner surface of the cover 22. The outlet blow W3 is then directed forward to exit through a portion below the blade holder 138 (around the base of the guide shoe 8).

The release unit 201 is housed in the power transmission housing 20 in front of the wall 186 and the lower wall 196.

The release unit 201 acts on the blade holder 138 for detachment of the blade.

The blade holder 138 in the slider 6 includes a push pin 210, a push-pin compression spring 211, a guide sleeve 212, a holder pin 213, a holder-pin compression spring 214, an auxiliary pin 215, a cam sleeve 216, a stop ring 217, an auxiliary sleeve 218, and a torsion spring 219.

The slider body 136 has, in its front end, a slit 220, a first holder-pin hole 222, a first auxiliary-pin hole 223, and a step 224.

The slit 220 extends in the front-rear and vertical directions. The slit 220 has a width (lateral dimension) slightly larger than the thickness of the blade.

The first holder-pin hole 222 is located on the left of the slit 220 and communicates with the slit 220. The first holder-pin hole 222 extends laterally.

The first auxiliary-pin hole 223 is located on the right of the slit 220 and communicates with the slit 220. The first auxiliary-pin hole 223 extends laterally. The first auxiliary-pin hole 223 faces the first holder-pin hole 222. The first auxiliary-pin hole 223 receives, in the middle on its left inner surface, a rib protruding radially inward from the other portion.

The front end of the slider body 136 has an outer diameter smaller than the outer diameter of the rear portion of the slider body 136. The step 224 is defined in the portion where the outer diameter of the slider body 136 changes.

The slit 220 receives the push pin 210 in its vertically middle portion. The push pin 210 extends in the front-rear direction. The push pin 210 has a D-shaped cross section.

The slit 220 receives the push-pin compression spring 211 in its vertically middle portion. The push-pin compression spring 211 is an elastic member, or more specifically, a coil spring. The push-pin compression spring 211 is located behind the push pin 210. The rear end of the push-pin compression spring 211 is in contact with the torsion spring 219. The front end of the push-pin compression spring 211 is in contact with the push pin 210. The push-pin compression spring 211 is located between the push pin 210 and the slider body 136. The push-pin compression spring 211 urges the push pin 210 frontward.

The guide sleeve 212 is cylindrical. The guide sleeve 212 is located outside the front end of the slider body 136. The guide sleeve 212 has an axis extending in the front-rear direction.

The guide sleeve 212 has a second holder-pin hole 226 and a second auxiliary-pin hole 228 in its middle portion.

The second holder-pin hole 226 is located on the left of the guide sleeve 212. The second holder-pin hole 226 extends laterally. The second holder-pin hole 226 is aligned with the first holder-pin hole 222. The second holder-pin hole 226 has a larger diameter than the first holder-pin hole 222.

The second auxiliary-pin hole 228 is located on the right of the guide sleeve 212. The second auxiliary-pin hole 228 extends laterally. The second auxiliary-pin hole 228 faces the second holder-pin hole 226. The second auxiliary-pin hole 228 has the same diameter as a portion of the first auxiliary-pin hole 223 leftward from the rib.

The holder pin 213 is received in the first holder-pin hole 222 and the second holder-pin hole 226. The holder pin 213 is cylindrical and extends laterally. The holder pin 213 has its middle portion with substantially the same diameter as the left portion of the first holder-pin hole 222. The holder pin 213 has a left end with a smaller diameter than the other portion. The holder pin 213 thus has a step on the left end (a stepped pin). The holder pin 213 has the left end tapered leftward. The holder pin 213 has a right end with a larger diameter than the other portion. The right end of the holder pin 213 is a head with a larger diameter than the other portion. The holder pin 213 has a curved right surface expanding rightward.

The holder-pin compression spring 214 is an elastic member, or more specifically, a coil spring. The holder-pin compression spring 214 has its left end in contact with the larger-diameter portion of the first holder-pin hole 222. The holder-pin compression spring 214 has its right end in contact with the left surface of the head of the holder pin 213. The holder-pin compression spring 214 is located between the holder pin 213 and the slider body 136. The holder-pin compression spring 214 urges the holder pin 213 leftward.

The auxiliary pin 215 is received in the first auxiliary-pin hole 223 and the second auxiliary-pin hole 228. The auxiliary pin 215 is cylindrical and extends laterally. The auxiliary pin 215 has its right end to be in contact with the rib on the first auxiliary-pin hole 223. The auxiliary pin 215 has substantially the same diameter as the right portion of the first auxiliary-pin hole 223 and as the second auxiliary-pin hole 228. The auxiliary pin 215 connects the guide sleeve 212 with the slider body 136.

The cam sleeve 216 is cylindrical. The cam sleeve 216 has its axis extending in the front-rear direction. The cam sleeve 216 is located outside the guide sleeve 212, the holder pin 213, and the auxiliary pin 215. The cam sleeve 216 is rotatable around the slider body 136 and the guide sleeve 212.

The cam sleeve 216 has an extension in its top to left portions. The extension extends radially outward from the other portion of the cam sleeve 216. The extension has a cam surface 216C on its inner surface. The cam surface 216C has a radial dimension gradually increasing counterclockwise from the top as viewed from the front. The cam surface 216C is in contact with the curved surface of the head of the holder pin 213.

Without the blade holder 138 receiving a blade, the head of the holder pin 213 is in contact with a portion of the cam surface 216C nearer the largest radial dimension. With the blade holder 138 receiving a blade, the head of the holder pin 213 is in contact with a portion of the cam surface 216C nearer the smallest radial dimension. The cam sleeve 216 includes a projection 234 protruding radially outward. The projection 234 is located on the right of the cam sleeve 216.

The stop ring 217 is annular. The stop ring 217 is fixed on the outer surface of the guide sleeve 212. The stop ring 217 is located in front of the cam sleeve 216 to restrict the forward movement of the cam sleeve 216.

The auxiliary sleeve 218 is cylindrical. The auxiliary sleeve 218 has its axis extending in the front-rear direction. The auxiliary sleeve 218 is located outward from the slider body 136 and is rotatable about the slider body 136. The auxiliary sleeve 218 is located in front of the step 224. The step 224 restricts backward movement of the auxiliary sleeve 218. The front end of the auxiliary sleeve 218 is received in the opening in the rear end of the cam sleeve 216 and connects to the rear end. The auxiliary sleeve 218 rotates together with the cam sleeve 216.

The torsion spring 219 is annular and elastic. The torsion spring 219 has its rear end extending vertically in the middle in the lateral direction to be received in the slit 220. The rear end of the torsion spring 219 is located between the rear bottom end of the slit 220 and the rear end of the push-pin compression spring 211. The rear end of the torsion spring 219 is fixed to the slider body 136. The torsion spring 219 excluding its rear end surrounds the front end of the slider body 136 and is located behind the auxiliary sleeve 218. The torsion spring 219 has its front end received in a hole in the front-rear direction in the auxiliary sleeve 218 and fixed to the auxiliary sleeve 218. The torsion spring 219 urges the auxiliary sleeve 218 circumferentially counterclockwise as viewed from the front.

The blade has a holding hole in its rear end. The holding hole has a slightly larger diameter than the right end of the holder pin 213. The blade has a cutout in its corner opposite to the edge at the rear end of the blade. The blade has a protruding tab on its rear end protruding rearward on the same side as the edge. The blade has a shoulder at the upper rear of the protruding tab. The blade has a protrusion at its rear end.

Without the rear end of the blade received in the slit 220, the front end of the push pin 210 is on the left of the holder pin 213. The holder pin 213 retracts rightward.

With the rear end of the blade received in the slit 220, the blade pushes, with the shoulder, the push pin 210 rearward against the urging force from the push-pin compression spring 211.

When the rear end of the blade moves further rearward to cause the holding hole in the blade to reach the left of the holder pin 213, the cam surface 216C of the cam sleeve 216 pushes the holder pin 213 leftward against the urging force from the holder-pin compression spring 214. More specifically, the cam sleeve 216 is urged by the torsion spring 219 through the auxiliary sleeve 218. The torsion spring 219 applies an urging force counterclockwise as viewed from the front. In response to the holding hole in the blade reaching the left of the holder pin 213 to allow the holder pin 213 to move leftward, the cam sleeve 216 rotates counterclockwise as viewed from the front. The curved surface of the holder pin 213 comes in contact with an inward extending portion (a portion with a smaller diameter) of the cam surface 216C. The cam surface 216C pushes the holder pin 213 leftward.

When pushed leftward, a portion of the holder pin 213 leftward from the step enters the holding hole in the blade to hold the blade.

The blade is thus automatically held when simply inserted in the slit 220 (quick attachment).

The auxiliary pin 215, which is different from the holder pin 213, fixes the guide sleeve 212 to restrict its movement in the front-rear direction and its rotation relative to the slider body 136. The holder pin 213 is received in the first holder-pin hole 222 having the right portion with the larger diameter.

The release unit 201 includes a release drum 240 and a tension spring 242.

The release drum 240 is cylindrical and is housed in the power transmission housing 20. The wall 186 restricts the backward movement of the release drum 240. The release drum 240 is adjacent to the blade holder 138. The release drum 240 surrounds the cam sleeve 216. The release drum 240 is an operation drum operable by the user to detach (release) the blade from the blade holder 138.

The release drum 240 includes an inward-raised portion 248 and an operation tab 250.

The inward-raised portion 248 is located on the inner surface of the release drum 240. The inward-raised portion 248 is raised radially inward from the other portion of the inner surface of the release drum 240. The inward-raised portion 248 is located on the right of the release drum 240.

The operation tab 250 is located on the right of the release drum 240. The operation tab 250 protrudes radially outward from the other portion of the outer surface. The operation tab 250 extends from the upper left to the lower right as indicated by the solid line in the figure, and elongated in the front-rear direction. The operation tab 250 is integral with other parts of the release drum 240 (the cylindrical body of the release drum). The operation tab 250 protrudes rightward through a first operation tab hole 252 in the power transmission housing 20 and a second operation tab hole 254 in the cover 22.

The tension spring 242 is a coil spring. The tension spring 242 is located circumferentially outside the release drum 240 and extends circumferentially on the release drum 240. The tension spring 242 is housed in the power transmission housing 20.

The tension spring 242 has a hook-shaped first end engaged with the release drum 240. The tension spring 242 has a hook-shaped second end fixed to the lower power transmission housing 20b.

With the tension spring 242 slightly stretched from its equilibrium length, the inward-raised portion 248 (the solid line in FIG. 12) on the release drum 240 is not in contact with the projection 234 (dot-and-dash line in FIG. 12) on the cam sleeve 216 in a blade holding state. In this state, the operation tab 250 on the release drum 240 is in contact with the lower ends of the first operation tab hole 252 and the second operation tab hole 254. In this state, the tension spring 242 may be in other states, such as the state having the equilibrium length.

The user operates the operation tab 250 at the lower position upward to rotate the release drum 240 on its axis extending in the front-rear direction against the urging force from the tension spring 242. This rotation of the release drum 240 causes the inward-raised portion 248 (the dot-and-dash line in FIG. 12) to come in contact with the projection 234 on the cam sleeve 216 and rotate the cam sleeve 216 clockwise as viewed from the front. This places the head of the holder pin 213 inside the larger diameter portion on the cam surface 216C. The holder pin 213 also retracts leftward and exits through the holding hole in the blade under the urging force from the holder-pin compression spring 214 (holding released). The push pin 210 then moves forward under the urging force from the push-pin compression spring 211 to push the released blade forward and then moves to the left of the holder pin 213.

The release drum 240 in the release unit 201 cooperates with the internal blade holder 138, causing the blade to be released from the blade holder 138 in response to the upward operation performed on the operation tab 250.

The push pin 210 on the right of the holder pin 213 restricts rightward movement of the holder pin 213. The holder pin 213 thus restricts counterclockwise rotation of the cam sleeve 216 as viewed from the front, against the urging force from the torsion spring 219 applied counterclockwise as viewed from the front.

The operation drum may be used to attach the blade instead of or in addition to releasing the blade.

The outlet blow W2 toward the blade holder 138 flows between the release drum 240 and the slider 6 forward to the outside.

An operation example of the reciprocating saw 1 described above will now be described.

The user attaches a blade to the blade holder 138 in the slider 6 in an off-state. Typically, the blade is applied onto a workpiece from above. The blade is thus attached with the edge (applied part) facing downward. The blade may be attached to face upward to, for example, apply the blade from below.

The user adjusts the length of the guide shoe 8 as appropriate to place the front face of the guide shoe 8 onto a workpiece. The user attaches the charged battery 54 to the battery mount 50. The user operates the speed switching dial 36 to select the speed.

The user then holds the first grip 30 (and the second grip 60) and pulls the trigger 33 by a predetermined amount. This turns on the main switch body 34 and powers the motor 3 to rotate the motor shaft 80. The motor 3 operates on DC power rectified through the controller 40. The lamp 62 turns on in response to the trigger 33 pulled by an amount reaching or exceeding a specified amount. The specified amount is smaller than the predetermined amount set for the motor 3 to be powered.

A microcomputer in the controller 40 obtains information about the rotational state of the rotor 72 from the sensor board 75. The microcomputer in the controller 40 also controls the on-off state of each switching element in accordance with the obtained information about the rotational state, and sequentially applies a current through the coils 73 in the stator 71 to rotate the rotor 72. The controller 40 for the motor 3, which is a brushless motor, may typically generate heat when, for example, driving the microcomputer. The heat accumulating on the controller 40 may affect the operation of the controller 40.

The motor shaft 80 rotates at a rotational speed corresponding to a signal (the pulling amount of the trigger 33) from the main switch body 34 in an on-state. The motor shaft 80 rotates at a higher rotational speed in correspondence with a larger pulling amount of the trigger 33. The highest rotational speed of the motor shaft 80 is controlled by the controller 40 in accordance with the rotational state of the speed switching dial 36.

In response to rotation of the motor shaft 80, the crank cam 108 rotates with the bevel gear 100, the torque limiter 102, the countershaft 104, and the crank base 106, causing the slider 6 to move forward and backward. The balancer 144 moves in the direction opposite to the slider 6 in the front-rear direction. The slider 6 thus moves forward and backward with reduced vibrations.

The slider 6 guided by the front and rear oilless bearings 151 is restricted from facing in any direction other than the direction of the slider support body 150.

When the user turns the knob 174 in the orbital switching lever 170 forward (refer to the two-dot chain line in FIG. 1), the second flat surface 178 of the lever body 172 aligns with the front-rear and lateral directions (refer to FIG. 8) and separates from the rear plate 152. The bearing 156 in the orbital unit 12 travels relatively on the full circumference of the cam surface 130a on the crank cam 108, causing the slider support body 150 to pivot as the slider 6 reciprocates.

This causes orbital action throughout the reciprocation of the slider 6 (second orbital mode).

When the user turns the knob 174 in the orbital switching lever 170 backward (refer to the solid line in FIG. 1), the first flat surface 176 of the lever body 172 aligns with the front-rear and lateral directions (refer to FIG. 7) and lifts the rear plate 152. The bearing 156 in the orbital unit 12 travels relatively on about half the circumference of the cam surface 130*a* on the crank cam 108 to cause the slider support body 150 to pivot with the reciprocation of the slider 6 for half the circumference. For the remaining half of the circumference, the bearing 156 does not come in contact with the cam 130 and retains the orientation of the slider support body 150. This causes orbital action for about half the reciprocation of the slider 6 (first orbital mode).

As the user moves down the blade toward the workpiece with the slider 6 or the blade in operation, the edge of the blade reciprocating forward and backward comes in contact with the workpiece and cuts the workpiece.

The second orbital mode is suitable for a wood workpiece, for example. The first orbital mode is suitable for a metal workpiece, for example.

As the fan 4 rotates with rotation of the motor shaft 80, the air around the fan 4 is forced radially outward. An airflow (blow) thus reaches the fan 4 through the inlets 31 after being through the motor housing 18. The airflow then flows to the body outlets 56 and the lower outlet 48. In other words, blows such as outlet blows WD, WL, WR, and W1 to W3 occur.

Such blows cool the components in the body housing 2.

In particular, the motor 3 is cooled by the inlet blow through the inlets 31 to the fan 4. The inlet blow cools the stator 71 and the rotor 72 by passing between the stator 71 and the rotor 72. The inlet blow also passes through the stator 71 and cools the stator 71.

The outlet blows WL and WR from the fan 4 to the body outlets 56 flows outside the power transmission housing 20. The outlet blows WL and WR cool the power transmission housing 20 and the components inside.

The outlet blow WD from the fan 4 to the lower outlets 48 cools the controller 40. The outlet blow WD flows near the controller case 44 covering the control circuit board 42. The outlet blow WD thus cools the control circuit board 42 appropriately.

The outlet blow W1 flows above the power transmission housing 20. The outlet blow W2 flows through the release drum 240 radially inward. The outlet blow W3 flows in front of the power transmission housing 20. The outlet blows W1 to W3 thus cool the power transmission housing 20 and the components inside and in front of the power transmission housing 20. The outlet blow W1 branches into the outlet blows W2 and W3. This allows less outlet blow W2 to flow toward the blade holder 138 than when the outlet blow W1 does not branch. This reduces dispersion of dust produced from a workpiece. Although the outlet blow W3 eventually flows forward, the outlet blow W3 does not flows toward the blade holder 138 but flows forward around the guide shoe 8 below the blade holder 138. This reduces dispersion of dust produced from a workpiece.

In response to the user turning off the main switch body 34 by operating the trigger 33, the motor shaft 80 of the motor 3 stops to stop reciprocation motions and inflow and outflow of air. The lamp 62 turns off after a predetermined time.

The embodiments and the modifications are not limited to those described above. For example, the embodiments and the modifications may be further modified appropriately as described below.

Orbital action (trajectory motion) of the blade holder 138 and other components is not limited to elliptical and semi-elliptical motions. For example, the orbital action may include reciprocation along an imaginary semi-elliptical arc (swinging).

The first flat surface 176 may not be the continuous flat surface including the first portion 176*a* and the second portion 176*b*. For example, the first flat surface 176 may include a flat first portion 176*a* and a flat second portion 176*b* at a distance from the first portion 176*a*. Such a first portion 176*a* and a second portion 176*b* may together support the slider 6 directly or indirectly. At least one of the first portion 176*a* or the second portion 176*b* may protrude from the surrounding portion.

The cam 130 may be arc-shaped, linear, or curved as viewed from above. The cam 130 may be located on the lower surface of the crank cam 108. The cam 130 may be separate from the crank cam 108.

At least one of a portion of the reciprocation converter 5, the reciprocation converter 5, or the orbital switcher 14 (orbital switching lever 170) may be located above the slider support 161.

The reciprocation converter 5 may include a crank and connecting rod (connecting rod type), in place of the crank cam 108 extending in the front-rear and lateral directions (horizontal crank type). In another example, the reciprocation converter 5 may include a rotational member with a sloping cylinder surface and swash bearings on the sloping cylinder surface (swash type).

The body outlets 56 may be located in a portion of the cover 22 frontward from the reciprocation converter 5. The body outlets 56 may be located in the power transmission housing 20. The lower outlets 48 may be located outside the controller 40.

The cover 22 may be halved into right and left covers.

The ball bearing may be replaced by a needle bearing. The needle bearings may be replaced by ball bearings. At least one of the torque limiter 102 or the countershaft 104 may be eliminated. The size, arrangement, and number of at least the inlets 31, the body outlets 56, or the lower outlets 48 may be changed. The direction in which the battery 54 is attached or detached may be changed from the front-rear direction. Multiple batteries 54 may be attached. As described above, some of the components may be eliminated, or the number of components, their materials, shapes, types, and arrangement may be modified variously.

The tip tool may be any tool other than a blade.

In place of the battery 54, a cord may be used to supply power. The cord may be connected to utility power.

The embodiments and their modifications are applicable to reciprocating cutting tools other than the reciprocating saw 1 (e.g., a jigsaw), as well as to reciprocating tools other than reciprocating cutting tools, power tools, gardening tools, and electric work machines.

Second Embodiment

Figure 15A:
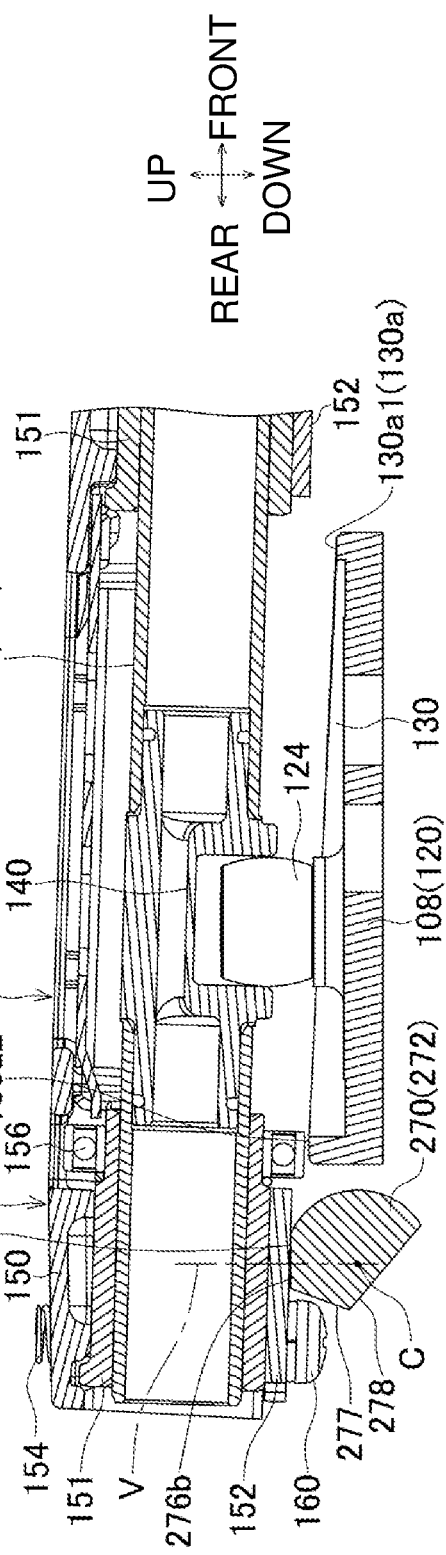
FIG. 15A is a central longitudinal sectional view of a main portion of a reciprocating saw according to a second embodiment, with the highest point on a cam surface at the rearmost position in a 1-1-orbital mode.
Figure 15B:
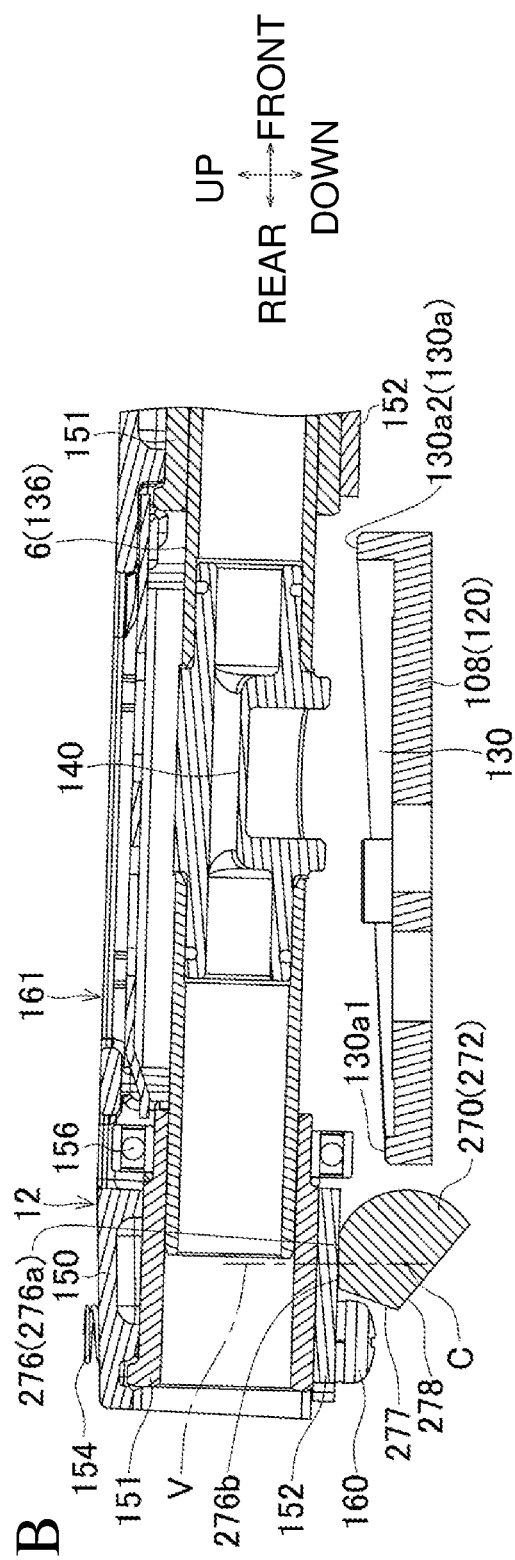
FIG. 15B is a central longitudinal sectional view of the main portion of the reciprocating saw in FIG. 15A, with the lowest point on the cam surface at the rearmost position in the 1-1-orbital mode.

FIG. 15A is a central longitudinal sectional view of a main portion of a reciprocating saw according to a second embodiment, with a highest point 130*a*2 on a cam surface 130*a* at the rearmost position in a 1-1-orbital mode. FIG. 15B is a central longitudinal sectional view of the main portion of the reciprocating saw in FIG. 15A, with a lowest point 130a1 on the cam surface 130a at the rearmost position in the 1-1-orbital mode.

FIG. 16A is a central longitudinal sectional view of the main portion of the reciprocating saw in FIG. 15A, with the highest point 130a2 on the cam surface 130a at the rearmost position in a 1-2-orbital mode. FIG. 16B is a central longitudinal sectional view of the main portion of the reciprocating saw in FIG. 16A, with the lowest point 130a1 on the cam surface 130a at the rearmost position in the 1-2-orbital mode.

FIG. 17A is a central longitudinal sectional view of the main portion of the reciprocating saw in FIG. 15A, with the highest point 130a2 on the cam surface 130a at the rearmost position in the second orbital mode. FIG. 17B is a central longitudinal sectional view of the main portion of the reciprocating saw in FIG. 17A, with the lowest point 130a1 on the cam surface 130a at the rearmost position in the second orbital mode.

The reciprocating saw according to a second embodiment is the same as the reciprocating saw 1 according to the first embodiment except the lever body of the orbital switching lever (and the positional relationship with the cam surface 130a in the vertical direction). The components and portions that are the same as those in the reciprocating saw 1 according to the first embodiment are given the same reference numerals, and will not be described.

A lever body 272 in an orbital switching lever 270 in the second embodiment has a first flat surface 276, a second flat surface 277, and a third surface 278. The first flat surface 276 is a first support flat surface extending laterally. The second flat surface 277 is a second support flat surface extending laterally. The third surface 278 is a surface for the second orbital mode extending laterally.

The first flat surface 276 and the second flat surface 277 are at a predetermined angle (about 100° in this example) to each other. The second flat surface 277 and the third surface 278 are at a predetermined angle (about 100° in this example) to each other.

The distance from the central axis C to the first flat surface 276 is larger than the distance from the central axis C to the second flat surface 277. The distance from the central axis C to the second flat surface 277 is larger than the distance from the central axis C to the third surface 278.

In the 1-1-orbital mode in FIGS. 15A and 15B, the first flat surface 276 of the orbital switching lever 270 is constantly in contact with the rear bottom (rear plate 152) of the slider support 161.

In other words, when the highest point 130a2 on the cam surface 130a is at the rearmost position as shown in FIG. 15A, the first flat surface 276 supports the rear bottom of the slider support 161, without the cam surface 130a being in contact with the slider support 161 (bearing 156). When the lowest point 130a1 on the cam surface 130a is at the rearmost position as shown in FIG. 15B, the first flat surface 276 supports the rear bottom of the slider support 161 without the cam surface 130a being in contact with the slider support 161. Thus, in the 1-1-orbital mode, no orbital action of the blade holder 138 is performed throughout the range of the reciprocation. The blade holder 138 reciprocates linearly forward and backward.

In this state, the first flat surface 276 extends, in the front-rear direction, on both sides of the imaginary perpendicular plane V including the central axis C and perpendicular to the first flat surface 276. More specifically, the first flat surface 276 extends through the perpendicular plane V. In other words, the first flat surface 276 has a first portion 276a frontward from the central axis C (perpendicular plane V) and a second portion 276b rearward from the central axis C (perpendicular plane V).

In the 1-2-orbital mode in FIGS. 16A and 16B, the second flat surface 277 of the orbital switching lever 270 can be in contact with the rear bottom of the slider support 161.

In other words, when the highest point 130a2 on the cam surface 130a is at the rearmost position as shown in FIG. 16A, the cam surface 130a comes in contact with the slider support 161 (bearing 156), with the second flat surface 277 separating from the rear bottom of the slider support 161. When the lowest point 130a1 on the cam surface 130a is at the rearmost position as shown in FIG. 16B, the second flat surface 277 supports the rear bottom of the slider support 161, without the cam surface 130a being in contact with the slider support 161. In the 1-2 orbital mode, in the same manner as in the first orbital mode, the orbital action of the blade holder 138 is not performed for about half the range of the reciprocation. The blade holder 138 reciprocates along a semi-elliptical trajectory.

In this state, the second flat surface 277 extends, in the front-rear direction, on both sides of the imaginary perpendicular plane V including the central axis C and perpendicular to the second flat surface 277. More specifically, the second flat surface 277 extends through the perpendicular plane V. In other words, the second flat surface 277 has a first portion 277a frontward from the central axis C (perpendicular plane V) and a second portion 277b rearward from the central axis C (perpendicular plane V).

In the second orbital state as in FIGS. 17A and 17B, the third surface 278 of the orbital switching lever 270 faces the rear bottom of the slider support 161 across a space.

In other words, when the highest point 130a2 on the cam surface 130a is at the rearmost position as shown in FIG. 17A, the cam surface 130a is in contact with the slider support 161 (bearing 156), with the third surface 278 being separate from the rear bottom of the slider support 161. When the lowest point 130a1 on the cam surface 130a is at the rearmost position as shown in FIG. 17B, the cam surface 130a is also in contact with the slider support 161, with the third surface 278 being separate from the rear bottom of the slider support 161. In other words, the bearing 156 in the slider support 161 comes in contact with the cam surface 130a throughout the circumference. Thus, in the second orbital mode, the orbital action of the blade holder 138 is performed throughout the range of the reciprocation. The blade holder 138 reciprocates along an elliptical trajectory.

The diameter of the orbital switching lever 170 is smaller in the portion facing the screw 160 on the third surface 278 than in the other portion. The orbital switching lever 170 thus avoids contact with the screw 160. The portion of the third surface 278 facing the screw 160 is recessed to avoid contact with the screw 160.

The reciprocating saw according to the second embodiment can be modified as appropriate in the same manner as the reciprocating saw 1 according to the first embodiment.

The lever body 272 in the reciprocating saw according to the second embodiment may have three or more support flat surfaces.

Third Embodiment

Figure 18:
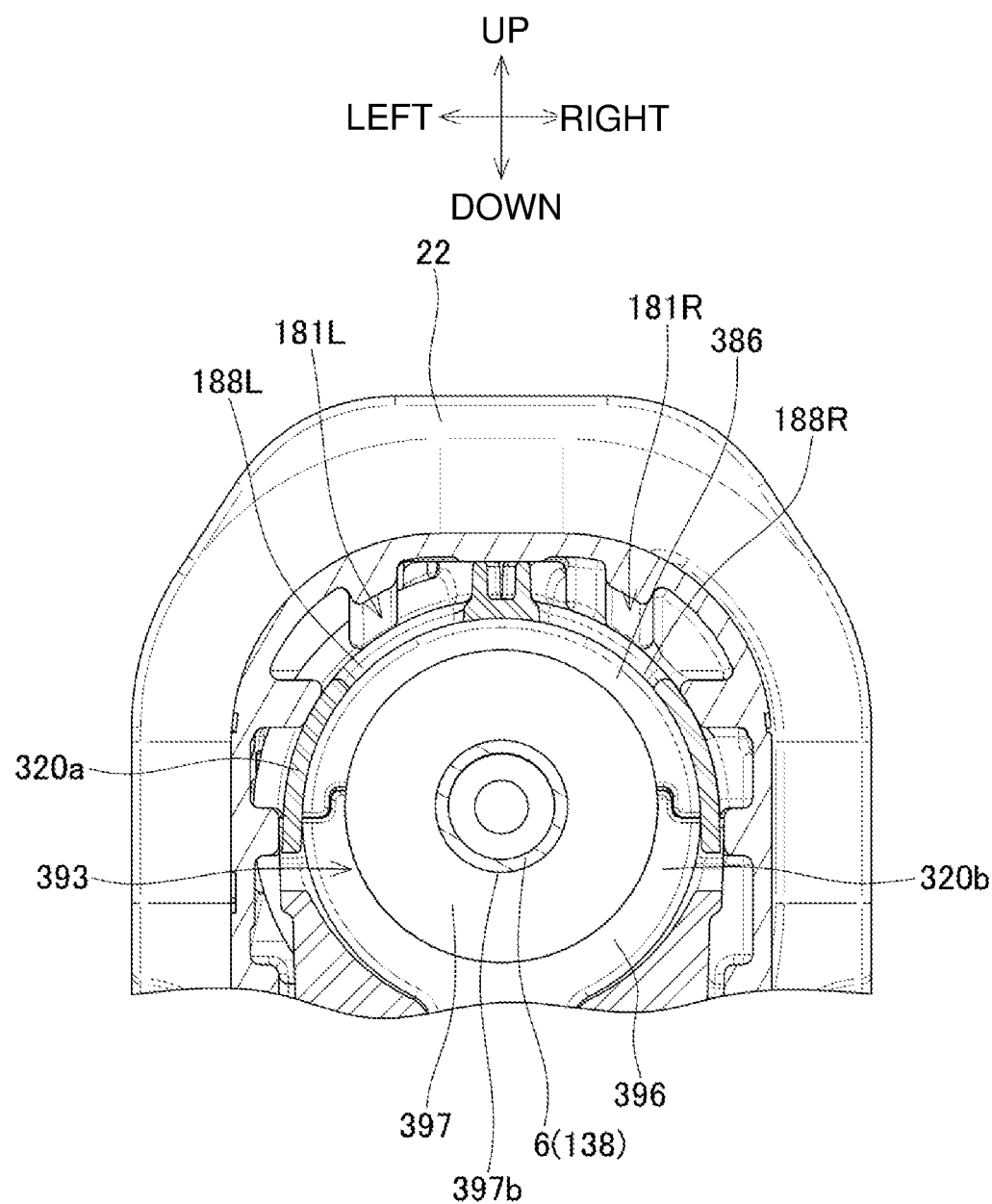
FIG. 18 is a view similar to FIG. 11 in a third embodiment.
Figure 19:
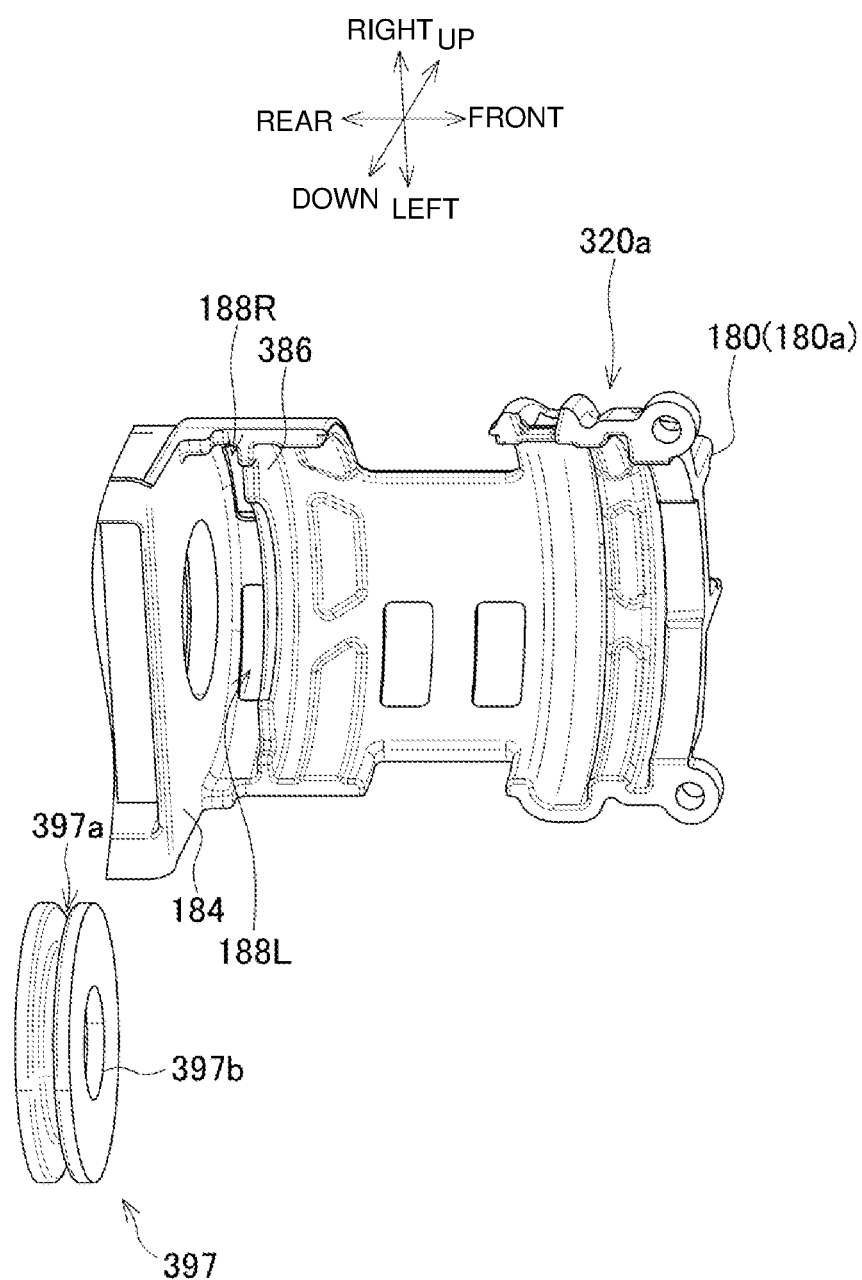
FIG. 19 is a view similar to FIG. 14 in the third embodiment of the present invention.

FIG. 18 is a view of a reciprocating saw according to the third embodiment, similar to FIG. 11. FIG. 19 is a view of the reciprocating saw according to the third embodiment, similar to FIG. 14.

The reciprocating saw according to the third embodiment is the same as the reciprocating saw 1 according to the first embodiment except the structure of the wall and the lower wall in the power transmission housing and their surroundings, and the second passage 192 (outlet blow W2) being substantially eliminated. The components and portions that are the same as those in the reciprocating saw 1 according to the first embodiment are given the same reference numerals, and will not be described.

In the reciprocating saw according to the third embodiment, a wall 386 in an upper power transmission housing 320a protrudes more than the wall 186 in the first embodiment. Similarly, in the reciprocating saw according to the third embodiment, a lower wall 396 in a lower power transmission housing 320b protrudes more than the lower wall 196 in the first embodiment. At least one of the wall 386 or the lower wall 396 may protrude by a degree other than described above.

An elastic (rubber) ring 397 is located between the wall 386 and the lower wall 396. The ring 397 extends vertically and laterally. The ring 397 has a groove 397a on its circumference. The groove 397a is recessed radially inward from its front and rear portions. The upper portion of the groove 397a receives the wall 386. The lower portion of the groove 397a receives the lower wall 396. The ring 397 is held by the wall 386 and the lower wall 396. The ring 397 has a hole 397b at its center.

The wall 386, the lower wall 396, and the ring 397 block the space from the front of the left hole 188L and the right hole 188R to the front of the lower front outlet 198 while allowing reciprocation the slider 6. The slider body 136 is received in the hole 397b and in contact with the hole 397b. The second passage 192 (outlet blow W2) toward the front (toward the blade holder 138) is thus substantially eliminated in the third embodiment. The wall 386, the lower wall 396, the ring 397, and the front wall 184 in the upper power transmission housing 20a behind the ring 397 define a third passage 393 in the third embodiment. The third passage 393 extends outside the reciprocating saw without extending toward the blade holder 138. The clearances 181L and 181R (first passage) connect to the third passage 393 alone. In the third passage 393, the outlet blow W1 from the left hole 188L and the right hole 188R does not branch and flows as the outlet blow W3 without flowing toward the blade holder 138.

In the third embodiment, the outlet blow W1 flows above the power transmission housing 20. Substantially no outlet blow W2 flows through the release drum 240 radially inward. The outlet blow W3 along the third passage 393 flows vertically in front of the power transmission housing 20. The outlet blows W1 and W3 thus cool the power transmission housing 20 and the components inside. The outlet blow W1 flows as the outlet blow W3 without flowing toward the blade holder 138. This allows less outlet blow W2 to flow toward the blade holder 138 than when the outlet blow W1 does not branch. This reduces dispersion of dust produced from a workpiece. Although the outlet blow W3 eventually flows forward, the outlet blow W3 does not flow toward the blade holder 138 but flows forward around the guide shoe 8 below the blade holder 138. This reduces dispersion of dust produced from a workpiece.

The reciprocating saw according to the third embodiment may be modified as appropriate in the same manner as the reciprocating saw according to at least one of the first embodiment or the second embodiment.

REFERENCE SIGNS LIST 1 reciprocating saw (reciprocating cutting tool)
3 motor
4 fan
5 reciprocation converter
6 slider
12 orbital unit
14 orbital switcher
20 power transmission housing
20a upper power transmission housing
20 lower power transmission housing
22 cover
30 first grip (grip)
62 lamp
71 stator
72 rotor
108 crank cam (crank)
122 eccentric pin
130 cam
138 blade holder (tip tool holder)
156 bearing
161 slider support
170, 270 orbital switching lever
172, 272 lever body (shaft)
176, 276 first flat surface (support flat surface)
176a, 276a, 277a first portion
176b, 276b, 277b second portion
178 second flat surface (second orbital mode surface)
180 ridge portion
181L, 181R clearance (first passage)
186 wall
188L, 188R hole
192 second passage
193 third passage
198 lower front outlet (lower outlet)
240 release drum
277 second flat surface (support flat surface)
278 third surface (second orbital mode surface)
C central axis (rotation axis) of the lever body
W1 outlet blow (for the first passage)
W2 outlet blow (for the second passage)
W3 outlet blow (for the third passage)

What is claimed is:

1. A reciprocating cutting tool, comprising:
   a motor including a stator and a rotor;
   a reciprocation converter drivable by the motor;
   a rod-like slider, the slider being connected to the reciprocation converter to be reciprocable;
   a tip tool holder at a front end of the slider to hold a tip tool;
   a power transmission housing that houses the reciprocation converter and allows the slider to protrude from a front end of the power transmission housing;
   a fan rotatable together with the rotor; and
   a cover outward from the power transmission housing, the cover defining a first passage of cooling air from the fan between the power transmission housing and the cover, the first passage branching into a second passage toward the tip tool holder and a third passage not toward the tip tool holder, wherein
   the third passage includes a hole in the power transmission housing.

2. The reciprocating cutting tool according to claim 1, wherein the third passage includes a wall located in the power transmission housing.

3. The reciprocating cutting tool according to claim 2, wherein the wall includes a circular arc strip.

4. The reciprocating cutting tool according to claim 2, wherein
the first passage is between an upper portion of the power transmission housing and an upper portion of the cover.

5. The reciprocating cutting tool according to claim 1, wherein
the first passage is between an upper portion of the power transmission housing and an upper portion of the cover.

6. The reciprocating cutting tool according to claim 5, wherein
the hole in the third passage is in the upper portion of the power transmission housing.

7. The reciprocating cutting tool according to claim 5, wherein
the third passage includes a lower outlet in a lower portion of the power transmission housing.

8. The reciprocating cutting tool according to claim 1, wherein
the power transmission housing includes an upper power transmission housing, and a lower power transmission housing below the upper power transmission housing.

9. The reciprocating cutting tool according to claim 8, wherein
the third passage includes a wall located in the upper power transmission housing.

10. The reciprocating cutting tool according to claim 9, wherein the wall is a circular arc strip.

11. The reciprocating cutting tool according to claim 8, wherein
the third passage includes a lower wall located in the lower power transmission housing.

12. The reciprocating cutting tool according to claim 11, wherein
the third passage includes a wall located in the upper power transmission housing, and
the wall has a lower end aligned and continuous with an upper end of the lower wall.

13. The reciprocating cutting tool according to claim 11, wherein the lower wall is a circular arc strip.

14. A reciprocating cutting tool, comprising:
a motor including a stator and a rotor;
a reciprocation converter drivable by the motor;
a rod-like slider, the slider being connected to the reciprocation converter to be reciprocable;
a tip tool holder at a front end of the slider to hold a tip tool;
a power transmission housing that houses the reciprocation converter and allows the slider to protrude from a front end of the power transmission housing;
a fan rotatable together with the rotor; and
a cover outward from the power transmission housing, the cover defining a first passage of cooling air from the fan between the power transmission housing and the cover, the first passage branching into a second passage toward the tip tool holder and a third passage not toward the tip tool holder, wherein
the slider extends in a front-rear direction,
the reciprocating cutting tool further comprises a lamp configured to illuminate an area in front of the tip tool holder, and
the first passage is separated into two passages by a ridge portion housing a lead wire of the lamp and extending in the front-rear direction.

15. The reciprocating cutting tool according to claim 14, wherein
the third passage includes two holes in the power transmission housing, and
the two holes are located respectively on two sides of the ridge portion.

16. A reciprocating cutting tool, comprising:
a motor including a stator and a rotor;
a reciprocation converter drivable by the motor;
a rod-like slider, the slider being connected to the reciprocation converter to be reciprocable;
a tip tool holder at a front end of the slider to hold a tip tool;
a power transmission housing that houses the reciprocation converter and allows the slider to protrude from a front end of the power transmission housing;
a fan rotatable together with the rotor;
a cover outward from the power transmission housing, the cover defining a first passage of cooling air from the fan between the power transmission housing and the cover, the first passage branching into a second passage toward the tip tool holder and a third passage not toward the tip tool holder; and
a cylindrical release drum configured to release the tip tool held by the tip tool holder,
wherein the second passage extends radially inside the cylindrical release drum.

* * * * *